(12) United States Patent
Heinonen

(10) Patent No.: US 12,412,196 B2
(45) Date of Patent: *Sep. 9, 2025

(54) METHOD AND SYSTEM FOR USING AI MODELS TO OPTIMIZE A GOAL

(71) Applicant: LastBot Europe Oy, Oulu (FI)

(72) Inventor: Tero Heinonen, Sacramento, CA (US)

(73) Assignee: LastBot Europe Oy, Oulu (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/969,830

(22) Filed: Dec. 5, 2024

(65) Prior Publication Data

US 2025/0190868 A1    Jun. 12, 2025

Related U.S. Application Data

(60) Provisional application No. 63/606,661, filed on Dec. 6, 2023.

(51) Int. Cl.
*G06N 20/00* (2019.01)

(52) U.S. Cl.
CPC .................................. *G06N 20/00* (2019.01)

(58) Field of Classification Search
CPC ..................................................... G06N 20/00
See application file for complete search history.

(56) References Cited

U.S. PATENT DOCUMENTS

| | | | |
|---|---|---|---|
| 2019/0236482 A1* | 8/2019 | Desjardins | G06N 3/09 |
| 2021/0201207 A1* | 7/2021 | Liu | G06N 5/01 |
| 2022/0035877 A1* | 2/2022 | Nittur Sridhar | G06N 3/086 |
| 2022/0269835 A1* | 8/2022 | Yang | G06N 7/01 |
| 2022/0391300 A1* | 12/2022 | Trapani | H04L 41/145 |
| 2024/0420008 A9* | 12/2024 | Sengupta | G06Q 10/0639 |

* cited by examiner

*Primary Examiner* — Dave Misir
(74) *Attorney, Agent, or Firm* — ZIEGLER IP LAW GROUP, LLC.

(57) ABSTRACT

A method and system for optimizing a goal using artificial intelligence (AI) models. The system employs large language models (LLMs) for data normalization and message generation, alongside machine learning (ML) models for continuous training and optimization. It integrates structured and unstructured data into embeddings to evaluate performance metrics and iteratively refine outputs aligned with predefined criteria. The approach dynamically adapts to changes, enabling real-time decision-making and improved efficiency in applications such as customer engagement, sales, and marketing.

27 Claims, 11 Drawing Sheets

METHOD AND SYSTEM FOR USING AI MODELS TO OPTIMIZE A GOAL

TECHNICAL FIELD

The present disclosure relates generally to machine learning; more specifically, the present disclosure relates to a method and system for optimizing a goal using AI models.

BACKGROUND

Efficient customer communication is important across industries for all entities such as companies, enterprises, and businesses. Yet determining optimal message content, product recommendations, and customer targeting for key initiatives such as sales, marketing, and retention poses a persistent challenge. The complexity of identifying ideal solutions for countless customer-product-message-outcome combinations exceeds human data processing capabilities. Recent advancements in Artificial Intelligence (AI) offer potential solutions. For example, Large language models (LLMs) like GPT facilitate scalable natural language generation, while multilayer perceptrons (MLPs) quickly learn complex representations. Integrating these technologies into a Reinforcement Learning (RL) system holds promise for AI-driven marketing and sales automation, continuously improving customer interactions.

Several solutions explore AI's role in enhancing marketing and sales, focusing on specific aspects of customer interaction. However, a comprehensive business optimization framework is lacking, particularly in data efficiency, multi-turn dynamics for dialog policy learning, and integrating domain ontology into dialog systems. Deep RL is acknowledged for constructing intelligent autonomous systems in Conversational AI. A Chatbot conversational model, leveraging contextual information for accurate responses, demonstrates RL's better alignment with human preferences compared to supervised methods. Meta-learning for NLP illuminates task construction settings and applications, especially in recommendation systems, where RL optimizes long-term user engagement. Despite these techniques, a combination of optimizing messaging, products, targeting, and business objectives remains unexplored in prior systems.

Therefore, there is a need to address the aforementioned technical drawbacks in existing technologies in selecting data related to a recipient.

SUMMARY

The aim of the present disclosure is to provide a method and system for optimizing a goal using AI models. The aim of the disclosure is achieved by the method and system as defined in the appended independent claims to which reference is made to.

Embodiments of the present disclosure dynamically improve enterprise sales, marketing, and customer service. The present disclosure can efficiently sample high-performing messages, train from each customer interaction, and drive measurable gains on key business metrics.

Additionally, the present disclosure provides for example an artificial intelligence (AI)-based customer communication automation for entities (e.g., enterprises, and other organizations), proving its effectiveness over time by accelerating revenue growth and enhancing customer lifetime value.

These and other aspects of the disclosure will be apparent from the implementation(s) described below.

BRIEF DESCRIPTION OF DRAWINGS

Implementations of the disclosure will now be described, by way of example only, with reference to the accompanying drawings, in which.

DETAILED DESCRIPTION OF EMBODIMENTS

Figure 1:
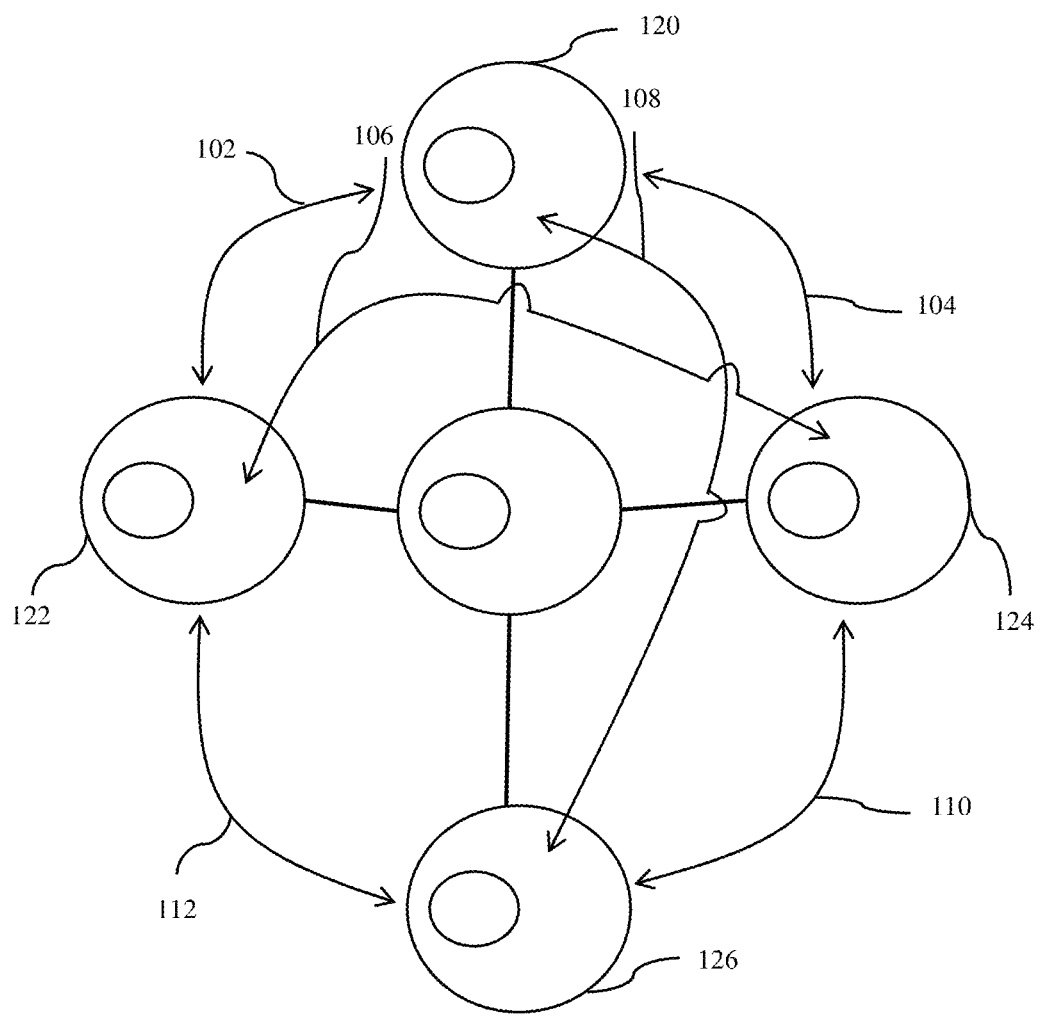
FIG. 1 is an exemplary diagram of a method that illustrates relations and interactions between a recipient and an entity (e.g., a business enterprise) in accordance with an implementation of the disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, there is provided a method for selecting data related to a recipient, the method comprising: obtaining a plurality of data sets; enriching data of the plurality of the data sets; normalizing the data of the plurality of the data sets; forming embeddings of the normalized data; and using machine learning to find from the embeddings a target embedding for a target recipient.

More specifically, the present disclosure provides a method for optimizing a goal using AI models, the method comprising predefining criteria for completion of the optimization; determining one or more performance metrics, wherein the one or more performance metrics are arranged to quantify one or more aspects of interest related to the optimization; receiving one or more input data sets relevant to the optimization goal; receiving one or more instructions defining operations to be performed in relation to the one or more input data sets and the optimization goal; using a first AI model, configured to process at least one of the one or more input data sets in combination with the one or more instructions, to generate first output data; applying a machine learning model to the first output data to calculate the one or more performance metrics configured to assess the one or more aspects of interest related to the optimization; providing at least one of the calculated one or more performance metrics or the first output data to a second AI model; using the second AI model, configured to process the one or more performance metrics in combination with one or more input data sets, to generate second output data aligned with the optimization goal; and iteratively refining the optimization and repeating the steps until the predefined criteria for completion are satisfied.

The goal in the description refers to a desired outcome or objective that an entity seeks to achieve through the application of AI models and machine learning techniques. This goal may include objectives such as improving customer engagement, maximizing sales, enhancing decision-making, or optimizing business processes. It encompasses measurable outcomes that can be quantified through performance metrics, such as customer lifetime value, revenue growth, or marketing conversion rates. Optimizing the goal thus involves using AI models and machine learning techniques to iteratively refine processes, data, and decisions to improve alignment with predefined criteria for success. Leveraging optimization strategies enables to dynamically improve outcomes over multiple iterations.

The predefined criteria for completion of optimization refers to measurable conditions or thresholds set in advance that determine when the iterative optimization process achieves its goal. These criteria are used to assess whether the outputs generated by the system align with the desired outcomes, such as achieving a target performance metric, a specific improvement in a business KPI, or satisfying a certain level of accuracy or efficiency in predictions.

The predefined criteria may be for example performance metrics, error thresholds, targeted outputs, iteration limits. The system integrates these predefined criteria into the optimization loop by defining the goal and aligning metrics to measure progress toward that goal, iteratively applying AI and machine learning models, assessing outputs against these predefined criteria and stopping iterations when outputs meet or exceed the predefined criteria.

Determining one or more performance metrics, wherein the one or more performance metrics are arranged to quantify one or more aspects of interest related to the optimization, refers to the process of defining new metrics according to the specific needs of the optimization goal and/or selecting specific measurable indicators from existing options that are used to evaluate and quantify the progress and effectiveness of an optimization process.

Performance metrics are measurable indicators of key attributes or outcomes related to the optimization, such as accuracy, efficiency, revenue growth, or customer satisfaction. By quantifying these aspects, the metrics provide a basis for evaluating whether the system's outputs are moving toward the predefined criteria for optimization success. The performance metrics thus may comprise any aspect of interest (including but not limited to predictions). For example: number of words in the first data (non-predictive) and estimated click-though probability (predictive), information gain (for reinforcement learning, predictive at this step).

Optionally, the one or more performance metrics are calculated using the first output data in conjunction with at least one of the one or more input data sets. This improves the accuracy and contextual relevance of the evaluation leading to a more robust and effective optimization cycle. By considering both the generated output and the original input data, the system ensures that the performance metrics reflect how well the output aligns with the context and requirements of the optimization goal.

Receiving one or more instructions defining operations to be performed in relation to the one or more input data sets and the optimization goal means that how the one or more input data sets are to be processed or how the optimization goal is to be addressed. Such instructions may be inputs in the form of a natural language text prompt, structured text prompt, an example text, an example image, a chart, a template, a code, an audio input, a video input or any combination thereof.

Using a first AI model, configured to process at least one of the one or more input data sets in combination with the one or more instructions, to generate first output data refers to employing an artificial intelligence model specifically designed to handle and analyze relevant input data along with provided operational instructions. The first AI model is a system trained to perform computational or decision-making tasks and configured to process at least one of the input data sets, which may include data relevant to the optimization goal (e.g., customer, transaction, or contextual data). It combines this input data with instructions (e.g., rules or parameters) that define the operations or objectives to be performed. The result of this processing is the first output data, which could be predictions, recommendations, classifications, or other forms of processed information that contribute to achieving the optimization goal. This step enables to interpret and transform raw or enriched input data into actionable outputs.

Applying a machine learning model to the first output data to calculate the one or more performance metrics configured to assess the one or more aspects of interest related to the optimization refers to the use of a trained machine learning model to analyze and evaluate the initial outputs generated by the first AI model. The machine learning model is trained to take the first output data as input, which may include processed results such as predictions, recommendations, or other generated information. It calculates performance metrics, which are measurable indicators designed to evaluate key aspects such as accuracy, efficiency, or relevance of the first output data. These metrics are configured to quantify the aspects of interest related to the optimization goal, such as achieving higher customer engagement, improving decision accuracy, or maximizing revenue. This ensures that the optimization process is guided and refined based on objective, quantifiable evaluations of the system's performance.

The machine learning model comprises at least one of neural network, multilayer perceptron (MLP), support vector machines, decision-trees, random forests, gradient boosting machines, K-nearest Neighbors (kNN), naïve Bayes, linear regression, classifiers, logistic regression models, or principal component analysis (PCS).

Providing at least one of the calculated one or more performance metrics or the first output data to a second AI model refers to transmitting either the evaluated performance metrics, the processed outputs from the first AI model, or both, as inputs for further processing by the second AI model. The performance metrics provide quantifiable evaluations of the first output data, enabling the second AI model to refine or adjust its processing based on this evaluation. The first output data represents the processed data from the first AI model, which serves as an input for the second AI model. The second AI model uses the received inputs to perform additional computations, align outputs with the optimization goal, or generate refined results for subsequent steps. This facilitates a layered processing approach where the outputs of one model feed into another for enhanced optimization and decision-making.

In an alternative embodiment, wherein the first AI model and the second AI model are the same, the performance metrics alone are sufficient since the first model's output is inherently available. If the models are separate, both the performance metrics and the first output data are required to ensure the second AI model has all necessary inputs for its computations.

In another embodiment, the machine learning model, and at least one of the first AI model, or the second AI model are the same AI model, i.e., integrated into a single model. This enables the system to operate more efficiently by reducing the complexity and resource requirements associated with using multiple distinct models. It ensures consistent data handling, reduces potential integration challenges, and simplifies model management, which leads to faster processing times and reduced computational overhead, as the system does not need to switch between or synchronize multiple models.

Additionally, this design enhances adaptability, as the same model can be continuously trained and optimized across all roles, maintaining alignment with the optimization goal.

Using the second AI model, configured to process the one or more performance metrics in combination with one or more input data sets, to generate second output data aligned with the optimization goal refers to employing a second AI model designed to integrate evaluated performance metrics with additional or refined input data. The second AI model processes this combination of metrics and data to produce second output data, which represents an improved or more targeted result. This second output data is specifically aligned with the predefined optimization goal, ensuring the system's outputs are progressively closer to achieving the desired outcome. This enables iterative refinement, leveraging both the performance assessment and new data to enhance the optimization process.

Progressively closer depends on the predefined criteria and comprises a performance metrics value being closer to a predefined value (greedy search). Progressively closer can also mean progress if accordance with any other algorithmic criteria, including without limitations Markov chain Monte Carlo (MCMC), heuristic optimization, beam search, graph search, contrastive decoding, hybrid search, A star, Q star, Q-learning, depth-first search, or breadth-first search. In these other modalities the values of the performance metrics over iterations follow either deterministically or stochastically the desired optimization algorithm where the values of a performance metrics may from iteration to iteration be "better" or "worse" i.e. closer to a desired level. For example, when using MCMC, the performance metric is used to draw samples from a probability distribution, where a subset of subsequent performance metrics together represents the desired outcome of the optimization. An example of this is when the method is used to optimize between four different outcomes for the response of a customer to a marketing message: the customer canceling subscription, the customer keeping the current subscription, the customer downgrading to a less expensive subscription, or the customer upgrading to a more expensive subscription. It may be desirable to optimize the joint weighted probability of these outcomes. The method configured for MCMC will then include performance metrics that represent acceptance or rejection of a specific marketing message in each iteration. Each iteration of the method is then an implementation of a step in the MCMC method. In each case each of the performance metrics can be related to either desired outcome or internal metrics in accordance with the desired algorithm.

The first AI model and the second AI model may be a generative model, a reinforcement learning model, a language model, a machine learning based model. The machine learning based model may be any model, which uses machine learning based approaches, e.g., regression or classification models.

Iteratively refining the optimization and repeating the steps until the predefined criteria for completion are satisfied refers to a cyclical process where the system evaluates its outputs, identifies areas for improvement, and adjusts its inputs, models, or computations accordingly. Each iteration involves repeating earlier steps, such as processing input data, calculating performance metrics, and generating outputs, to progressively enhance alignment with the optimization goal. This iterative process continues until the predefined criteria, such as achieving a target performance metric or a specific outcome threshold, are met, signaling the completion of the optimization. The output is part of the (next iteration) input data set. The second output data is reintroduced as part of the one or more input data sets, and the steps are repeated until predefined criteria for completion are satisfied. This approach ensures continuous improvement and convergence toward the desired objective.

Alternatively, iteratively refining the optimization comprises introducing the second output data as part of the input data sets. This improves the system's ability to adapt and align outputs more closely with the optimization goal. By feeding the second output data back into the process it allows the system to dynamically incorporate newly learned patterns or insights into subsequent iterations. This feedback loop enhances the accuracy and relevance of the generated outputs, leading to more refined and effective optimization over time. This ensures continuous improvement by leveraging previously generated outputs to fine-tune the optimization process.

Alternatively, iteratively refining the optimization comprises introducing the second output data directly as new first output data, and applying the machine learning model to the new first output data to calculate updated one or more performance metrics. This improves the efficiency and accuracy of the optimization process. By directly using the second output data as the new first output data, the system reduces redundancy and accelerates convergence by eliminating the need to process entirely new input data. Recalculating updated performance metrics ensures that the system continuously evaluates and refines outputs based on the most recent results, improving alignment with the optimization goal. This enables faster and more targeted optimization iterations.

Optionally, the one or more performance metrics represents a predicted outcome in response to the first output data. This enables the system to evaluate the effectiveness of the first output data in achieving the optimization goal before actual outcomes are realized. This predictive capability allows the system to preemptively assess the likely success or impact of the first output data, facilitating more informed decision-making and iterative refinement. By relying on predictions, the system can dynamically adjust and optimize processes in real-time, reducing the need to wait for actual outcomes and accelerating the overall optimization cycle. The outcome encompasses actions, events, or changes in the physical or virtual world.

The method according to the present disclosure thus enables the integration of input data, instructions, and AI models to generate and refine outputs iteratively. By calculating performance metrics and reintroducing these into the process, it ensures dynamic optimization and progressive improvement toward the goal. It enhances efficiency, reduces the need for manual intervention, and ensures better alignment with the desired outcomes, making it highly adaptable for applications like predictive modeling, decision-making, and AI-driven process optimization.

The one or more input data sets relevant to the optimization goal refer to the one or more data sets that may include personal data, transaction data, recipient data, marketing data, support data, partner data, and public data. Optionally, the one or more data sets include unstructured text, including product descriptions, recipient history, messaging, etc.

The method enriches the data of the one or more data sets using a data enrichment layer. The enrichment of the data includes adding inputs to the data enrichment layer with additional data. The additional data may be obtained from at least one of an external data source, or an internal data source. The enrichment of the data is a computational step that includes querying the internal data source or the external data source and its caches. The additional data is added to the input of the data enrichment layer if the additional data corresponding to any of the inputs is identified based on the computational step. For example, a third-party device may provide attributes related to the recipient, or alternatively, there may be a cache of recent contextual actions that can be added to the additional data. Optionally, the additional data is represented and concatenated in natural language.

Thus, the method may further comprise preprocessing at least one of the one or more input data sets by performing at least one of: cleaning the input data; or enriching the input data. The system configured to preprocess at least one or more input data sets through cleaning or enriching ensures that the data fed into AI models is both high-quality and contextually relevant. This improves the performance, adaptability, and scalability of the system while reducing inefficiencies and errors in the optimization process.

The method normalizes the data of the one or more data sets using a Large Language Model (LLM) layer. The LLM layer normalizes the data to transform unstructured data and/or structured data into a format that is suitable for further training the ML layer considering interdependencies of the one or more data sets. The large language model (LLM) is an example implementation of the AI model, performing tasks according to the embodiments of the present disclosure and contributing to the iterative optimization process. The normalization of data includes extraction of the normalized data from the unstructured data using (i) the LLM layer and (ii) prompting. The LLM layer may extract key information from the unstructured data into a consistent normalized form using prompts and templates. The prompting may be template-based, dynamic or programmatic.

In the normalization of data, the one or more data sets are referred as, (i) recipient data set ($\Lambda$) with individual recipient data represented by $\lambda$, (ii) brand, product and deal data set (B), with individual brand, product and deal data represented by $\beta$, (iii) contextual data set ($\Gamma$), with individual contextual data represented by $\gamma$ and (iv) message data set ($\Delta$), with individual message data represented as $\delta$. The data sets $\Lambda$, B, $\Gamma$, and $\Delta$ are infinite-dimensional; however, the dimensionality is constrained by practical computing limitations.

The LLM layer normalizes the data to transform each data set $\lambda$, $\beta$, $\gamma$, and $\delta$ into their normalized forms $\lambda'$, $\beta'$, $\gamma'$, and $\delta'$. The LLM layer may include a transformer architecture to employ the normalization process. In addition, the transformer architecture utilizes positional encoding and multi-head attention, thereby enabling processing and semantic encoding of both scalar data and sequential dense or sparse data. For example, the scalar data may include the age of the recipient. For example, the sequential dense or sparse data may include purchase history or prior employment, effectively considering interdependencies and relations within each input. Optionally, the normalization of data is performed using any specific implementation of LLM. Optionally, a plurality of LLM layers (e.g., a Llama-2 70 billion parameter model) are employed to perform the normalization of data. Optionally, two or more of the plurality of LLM layers are used together to normalize the data partially or fully.

The plurality of LLM layers may be interchangeable and may be replaced with another LLM from time to time.

The message data set ($\Delta$) may include a discrete set of possible messages that can be communicated with recipients defined for example from a dataset of previous messages with recipients, or previously defined set of messages desired. The discrete set of messages restricts the applicability only to those matters and discussions where a predetermined relevant message is available. The discrete set of message restricts the commercial applicability but at the same time guarantees that the messages are within the desired data set ($\Delta$). Optionally, the LLM layer samples an infinite-dimensional data set to analyze all possible messages corresponding to real-life applications where the messages are not constrained by a predefined set of messages. The LLM layer samples the message data set ($\Delta$). The normalized data $\lambda'$, $\beta'$, $\gamma'$ may be fed in the prompts to the LLM layer together with a prompt. The prompt may include a number and types of desired messages. The LLM layer may generate between 10-1,000 alternative messages; for example, the alternative messages can be 1, 5, 10, 50, 100, 250, 500, or 1000 messages. The LLM layer may generate a plurality of messages as the LLM layer has the benefits of being pretrained with a very large corpus of text covering such a high number of different real-life situations and contexts that a likelihood of at least one of the trained situations or contexts being relevant to the topic matter of the present situation is high, optionally being trained across the one or more data sets, and maintaining control over the sampled distribution.

The LLM layer may generate the plurality of messages by covering different semantic perspectives. The transformer architecture of the LLM layer supports the LLM layer to store previous message suggestions in a context and generates the plurality of messages that differ from the previous message suggestions in the same context. This inherent capability of the LLM layer can be invoked through prompting.

Optionally, to sample further away from the nominal messages a temperature of the LLM token sampling step can be adjusted, and alternative and custom sampling algorithms used and the LLM layer instructed in the context (as part of the prompt) of a desired type of messages and variation. This allows for achieving a targeted distribution of messages in the message data set ($\Delta$), either nearer to or distant from the nominal vector(s).

In addition, individual messages $\delta i$ during the generation of ordered set of messages $\delta 0, \delta 1, \ldots \delta N$ against the prediction model for the predicted outcome for the message $\delta i$ can be evaluated. Individual messages $\delta i$, representing elements within the message data set, can form part of the first output data or second output data, where the index i indicates iterations in the method. This evaluation can be invoked after a new token has been sampled from the logits, when a pattern denoting the end of an individual message is recognized.

The most recent message can then be extracted, the outcome predicted, and value tokens inserted into the output token sequence. These value tokens are configured to instruct the LLM of the expected value of the most recent message. The value tokens may be expressed in natural language, as numerical values encoded into tokens, or as specials tokens reserved for expressing the value. The value tokens are further configured to inform the LLM on the merits of each previously generated message di. As the LLM attends previously generated messages with their value tokens while generating the next message, the value tokens implicitly help the LLM to guide its search in A towards the desired distribution, for example in the simplest case towards the highest predicted value.

This is favorable in comparison to explicit planning or search algorithms of the A as the present approach implements iteratively optimizing search of the message data set ($\Delta$) implemented solely in the token sequence space without the need for explicit search algorithms or higher-level abstractions such as trees of thoughts.

Thus, optionally, the first output data comprises a sequence of tokens generated by the first AI model, the tokens being selected to match a predefined pattern. This ensures alignment with specific requirements, improving consistency and suitability for downstream processing, enhances the accuracy of performance metrics by reducing irrelevant variations and facilitates better interpretability and utility for tasks like predictions or evaluations and supports an efficient feedback loop for refining subsequent outputs, improving overall system performance.

For example, if the optimization is optimal message for a recipient, then the predefined pattern can be that the AI Model has just generated a complete message (which then will be assesses using performance metrics) vs. it would be assessed after each token while generating. When optimizing a product recommendation, the pattern would be once a new product recommendation alternative has been outputted (vs. assessing after every token while the product recommendation is not yet complete).

The method may further comprise providing the one or more performance metrics to the AI model by encoding the one or more performance metrics as tokenized text; or providing the one or more performance metrics to the AI model as special tokens representing the values of the one or more performance metrics. The system is therefore further configured to encode the one or more performance metrics as: tokenized text; or special tokens representing the one or more performance metrics value.

By encoding the metrics as text, the AI model can leverage its natural language understanding capabilities to interpret the metrics in context. This allows for seamless integration with existing natural language pipelines. Pre-trained language models can process tokenized text without requiring modifications to their architecture, ensuring compatibility and efficient utilization of their pretrained capabilities.

Providing the performance metrics as special tokens enables the direct inclusion of performance metrics into the model's input without requiring interpretive processing. This can lead to faster processing and reduced ambiguity in how the metrics are represented. Special tokens allow for a highly controlled representation of metrics, ensuring that specific values or categories are distinctly recognized by the model. This can enhance accuracy and consistency when processing structured data or numerical values.

Further benefit of this approach for sampling and search is that as it relies on the basic characteristics of modern LLMs it directly benefits from any accelerations of the inference frameworks such as speculative sampling, optimization of attention and linear layers, distilled and sparse models.

The evaluation and injection of value tokens can be performed while processing the same token sequence and keeping the transformer state resident in the GPU, resulting in $O(n2)$ time complexity with respect to the number of messages n or more precisely the token length of these messages. This is much favourable to a scenario where the sequence would be restarted separately for each message prompted by all previous messages, where the time complexity is $O(n3)$. Also, any optimization of the LLM transformers algorithm such as sparse attention or parallel processing which can reduce $O(n2)$ time complexity will directly benefit the resent system correspondingly.

For practical implementation, the number of messages N to meet the real-time requirements of the current use case can be adjusted. A lower N will mean reduced exploration of the message data set ($\Delta$) and higher N will result in expanded exploration. The number of messages N can be part of the instructions provided to the system (e.g., "generate 10 messages") and/or represent the maximum number of iterations allowed to achieve the criteria for completion of the optimization according to the embodiments of the present disclosure.

For example, for an interactive voice response, 50 ms for generating the candidate messages may be allocated and choosing the optimal message and set N=10, while for an email response N=1,000 to optimize between the response time and coverage of search may be chosen. Even at the limit of N=1 the sole sampled message is reasonable and useful as it is conditioned on the in-context information $\lambda', \beta', \gamma'$ that the LLM can leverage applying its learned information. Besides the time complexity, another practical upper limit for N is the context window of the LLM, or in the era of extended context windows (such as through fractional positional encodings) the effective context length which still provides sufficient recall, for example 2 k tokens for Llama 2 7B, 24 k for Claude 2.1, and 64 k for OpenAI's GPT4Turbo. As the LLM is used as a sampler, the present method also tolerates less than perfect recall allowing the use of extended context window.

It is important to note that as a sampler of the message data set ($\Delta$) in the context of the RL framework, the goal of sampling is not to maximize expectation but provide, i.e., the goal of sampling is not limited to maximizing expectation but alternatively to providing a controllable method to manage the sampled distribution to reach the desired balance between exploitation and exploration.

The LLM layer is utilized as an efficient sampler of the message data set ($\Delta$), where the distribution of samples is shaped with one or more control parameters and achieved desired properties of the output distribution with a sample efficient method.

The method may sample the brand, product, and deal data set (B) from at least one of an enumerated discrete data set or a generated infinite data set. For example, the enumerated discrete data set can be a product inventory. Further, the method may analyze new products or deals, or changes to existing products. The method may analyze whole product portfolios, bundling, pricing models, etc.

The method may use generative capabilities of the LLM layer to analyze the brand, product, and deal data set (B) to support a new product introduction, market demand analysis, segmentation, and simulation. For example, the method may sample all existing products against all known recipients and select an optimum message for each recipient. This enables not only determining the optimal message, but also the optimal customer-product-message combinations. Alternatively, the method defines a new product by creating its textual description and verifies the new product with a defined segment of the recipients. The method may simultaneously optimize each message for each individual recipient which provides unprecedented capabilities to the method to evaluate new products, offerings, and bundles against trained data. This insight informs product management, marketing, and enterprises of how their recipients may respond to new ideas and offerings, and where they have to target their products.

The method forms embeddings of the normalized data, e.g., a first embedding, a second embedding, and a third embedding of the normalized data. The method may embed the normalized data into fixed-dimension dense vector representations using the LLM layer as fixed feature extractors.

The normalized data $\lambda'$, $\beta'$, $\gamma'$, and $\delta'$ may be projected into fixed-length embedding data sets using an encoder or encoder-decoder LLM or its derivatives. For example, the encoder-decoder LLM can be Bidirectional Encoder Representations from Transformers (BERT). The encoder-decoder LLM may map textual presentations into an embedding data set subject to a semantic proximity condition. These embeddings are then combined into a joined embedding vector in a predetermined order. The joined embedding vector may represent a specific transformed and normalized data point.

In the embodiment, wherein the system further comprises an embedding encoder configured to encode at least one of the one or more input data sets as embeddings, the method further comprise encoding at least one of the one or more input data sets as embeddings. Encoding input data as embeddings improves data representation, model performance, scalability, versatility, efficiency, and interoperability. These benefits collectively enhance the system's ability to process, analyze, and optimize complex datasets effectively in a variety of applications.

For example, let $\Sigma$ represent $R^d$ data set of all embeddings. The individual embedding vectors within this data set may be represented by $\sigma$ with a subscript to denote specific vectors (e.g., $\sigma_1, \sigma_2, \ldots, \sigma_n$).

In case there are multiple recipients $\lambda$, brands, products and deals $\beta$, contextual data $\gamma$, and messages $\delta$, the $\sigma$ ca be created for all combinations or a desired subset of combinations of them leading to a total of n embedding vectors $\sigma_1$, $\sigma_2, \ldots, \sigma_n$ and a machine learning step is applied separately for each of them.

The method uses machine learning to find from the embeddings a target embedding for a target recipient. A Machine Learning (ML) layer that is trained with data points to optimize specified outcomes (i.e. expected outcomes). The data points may be created from an encompassing reinforcement learning framework. The ML model is trained using customary training methodologies and algorithms. The ML model may obtain the embeddings, e.g., the first embedding, the second embedding, and the third embedding as inputs in $\Sigma$ data set that includes recipient, brand, product, deal, context, and message data. The ML model may be trained based on an output of the embeddings and may predict a sum of outcomes of a specific message delivered to a specific recipient at that moment and in the presence of contextual data. The outcomes may be defined by the entity and they apply to a specific recipient. For example, the outcomes may include purchases, clicks, satisfaction metrics, lifetime value, or other metrics. Each outcome has an associated economic value, which may be positive, zero, or negative. The value associated with an outcome may be derived from the business strategy, marketing and sales objectives, business KPIs, financial objectives, or similar metrics of the entity.

The ML model is continuously trained based on prior outcomes in the background. Optionally, the ML model is continuously retrained by incorporating new outcomes trained into the ML model in near real-time.

The method according to the present disclosure optimizes communications and interactions with the recipients, e.g., customers or users in real-time. The method may employ an advanced reinforcement learning (RL) framework that leverages large language models (LLMs) and continuously trained machine learning (ML) model for example deep multilayer perceptron (MLP) networks to optimize messaging, product recommendations, and recipient, e.g., a customer is targeted to maximize the specified outcomes (e.g., business outcomes). The method may implement machine learning ML using other methods comprising of support vector machines, decision-trees, random forests, gradient boosting machines, K-nearest Neighbors (kNN), naïve bayes, logistic regression, linear regression, principal component analysis (PCS) or other deep learning models than MLP.

The method may enable a customer dialog using a partially observable Markov Decision Process (MDP), where the method maximizes an expectation or another desired function of cumulative outcome distribution.

The method dynamically improves enterprise sales, marketing, and customer service. The method can efficiently sample high-performing messages, train from each recipient interaction, and drive measurable gains on key metrics related to the business. The method provides an artificial intelligence (AI)-based customer communication automation for entities, proving its effectiveness over time by accelerating revenue growth and enhancing customer lifetime value. The method integrates LLMs for message generation and data normalization with an efficiently trained ML for real-time training and inference. The method enables easy integration of new data sources, the new outcomes, and LLMs to accommodate evolving business needs.

The method achieves efficient machine learning through normalization and embedding steps, which facilitate the utilization of standard ML architectures such as MLP. Alternative input formats and contents may be abstracted into a fixed-dimensional dense semantic vector data set. The normalization of data may handle missing data by reconstructing, approximating, or estimating it from existing data, or representing it in a consistent encoding in an embedding data set. As a result, the method integrates the missing data into a parallel online training pipeline, eliminating the need for explicit handling of missing data at subsequent stages.

The method performs parallel continuous automated training and continuous deployment that enable ML model improvement without downtime or human interaction. The method performs continuous retraining to improve the performance of the ML model even in the absence of new outcomes since the previous retraining. The lack of outcomes serves also as new information that improves the ML model's performance. For example, if the recipient continues to not respond to a cold email, the ML model may change the expected value of similar messages in the same situation.

The method may be characterized as a Reinforcement Learning (RL) technique to train the LLM layer based on an optimal policy that maps states to actions that maximize an expected cumulative reward over time. The adaptive nature of the RL and the ML is combined to train the LLMs, thereby allowing the method to manage the complexity of real-world business environments. The dynamically trained ML may serve as a value function approximator in the observable Markov Decision Process (MDP). The MDP involves partial observability, with explicit states, e.g., context, while the recipient's mental processes remain unobservable.

In an example, the following may be defined.

State S is the state of the current communication context, including $\lambda'$, $\beta'$, $\gamma'$, and $\delta'$.

Action A is the message $\Delta(\omega)=\delta$ that is selected based on the state S.

Optimal Policy is a stochastic policy for choosing an Action from a distribution of potential actions. The policy maps the State S into action A by first generating an ordered set of candidate messages using LLM $\delta_0, \delta_1, \ldots \delta_N$, where each message $\delta_i$ is conditioned to the State a and previous messages $\delta_0, \delta_1, \ldots \delta_{i-1}$ and the corresponding predicted Rewards R $r_0, r_1, \ldots, r_i$, and secondly stochastically selecting a message $\delta$ by applying a stochastic sampling function on the R distribution selecting $R(\omega)=r_i$ and $\delta=\delta_i$.

Reward predictor $R^{\wedge}(S, \delta)$ is a known ML model for example a deep neural network that is used to learn optimal mapping from state S and a message $\delta$ to Reward R.

Reward or value function R is the sum of business outcomes each as discounted to the time of the message $$\sum (\text{Value}_{outcome} f(T_{outcome} - T_{message})).$$

Thereby result is a combination of the following strategies. Neural-Fitted Algorithms, where the ML is the continuously learned part of the system, which learns to map message $\delta$ to Reward R conditional to State S. Policy Iteration, where the $R^{\wedge}$ is continuously learned and retrained for every additional tuple S, $\delta$, r.

MCMC sampling of the candidate messages $\delta_0, \delta_1, \ldots \delta_N$ for each State S where each message $\delta_i$ is conditioned to the previous messages and their predicted Reward R and are selected stochastically in a Markov Chain process.

Thus, the present method and system does not learn policy selection function directly, instead it learns Reward function predictor $R^{\wedge}$. Consequently there are no direct RL hyperparameters to the learning such as learning rate or discount factor and effectively hyperparameters are implicit in the deep neural network implementing the $R^{\wedge}$. The present method and system uses MCMC sampling to explore the message data set ($\Delta$) conditioned also predicter rewards $r_0$, $r_1, \ldots, r_i$ from the reward predictor $R^{\wedge}$. The real State $S_{real}$ is partially and weakly observable as that also includes the state of mind of the end-customer which is only indirectly and partially observable in the State S. The real State $S_{real}$ is also continuously affected by actions outside the method and system described herein.

The method may further comprise conditioning at least one of the first AI model or the second AI model based on at least one of: the one or more performance metrics, at least one of the one or more input data sets, or at least one of the first output data or the second output data. Conditioning on performance metrics allows the AI models to dynamically adapt based on feedback about their prior outputs' effectiveness. For example, if the performance metric reflects a poor result, the model can adjust its behavior or parameters to improve outcomes. By incorporating input data and performance metrics, the AI models can fine-tune their operations to better align with the optimization goal, improving the accuracy and relevance of their predictions. By conditioning on input data, the AI models can become context-aware, tailoring their outputs to the specific characteristics of the provided data. For example, in customer engagement, the AI models can generate messages that are more personalized based on user preferences or historical data. Conditioning on output data enables the creation of a feedback loop where the model learns from its past decisions, progressively refining its output for future iterations.

The conditioning thus supports iterative optimization by enabling each successive output or decision to improve upon the previous one, based on the accumulated metrics, input, and output data. This ensures that the iterative process converges toward the predefined optimization goal more effectively. Conditioning on multiple data sources (metrics, inputs, outputs) increases the model's ability to handle variability and adapt to unforeseen changes in the optimization process. Conditioning ensures that decisions made by the AI models are grounded in the most relevant and up-to-date information available, improving the quality of decisions and outcomes.

Conditioning may comprise training time conditioning, inference time conditioning, or both, training time conditioning and inference time conditioning. When conditioning comprises of training time conditioning, for example training a large language model or fine-tuning a large language model, the training time conditioning can be applied to the first AI model, the second AI model, and to the machine learning model. Conditioning the AI model at training time can be used to align the models better with the desired goals. This alignment also improves the efficiency of the system as the first output data can be more desirable than before training time conditioning. Similarly, the second output data can converge faster to be aligned with the optimization goal. Training time conditioning both improve the efficiency (less iterations needed to achieve the predetermined criteria) reducing cost and resources needed for the optimization, and efficacy (the outcomes of using the model outputs are better than before training time conditioning) of the method improving the economic results of the use of the method for example higher average customer revenue.

Alternatively, conditioning comprises inference time conditioning, where the conditioning data is provided in the context of the AI model without training time conditioning. Inference time conditioning provides fast results and improve system responsiveness for example in interactive solutions as no model training is required.

Alternatively conditioning comprises of both training time and inference time conditioning. This combination improves both the system's long-term optimization and its ability to adapt in real-time. It ensures efficient performance while allowing dynamic adjustments to changing conditions.

The method may further comprise receiving one or more outcome data sets representing an outcome in response to the second output data, and conditioning at least of the machine learning model, the first AI model or the second AI model using at least one of the outcome data sets and at least one of: the one or more input data sets, the first output data, the second output data, the one or more performance metrics. This significantly improves the system's ability to adapt dynamically, optimize resources, align with goals, and provide more accurate, contextually relevant, and scalable solutions. It ensures that the models continuously evolve and refine their outputs, making the system highly effective in real-world applications.

The method can sample the message data set A efficiently and controllably in proximity to nominal vectors, thereby enabling improved performance even at the beginning of training. The message data set A may represent the first output data when generated by the first AI model or the second output data when refined and aligned with the optimization goal by the second AI model. The method exhibits performance akin to human capabilities even in the absence of explicit training data, leveraging the inherent training embedded within the LLMs, which are employed for message sampling.

The method may use pre-trained LLM models, thereby eliminating the need to subject the LLM for training or fine-tuning and the risk of data leakage between different customer environments through the LLMs.

The method may wholly or partially train or fine-tune the LLM models using the ML estimate to improve the LLM model responses. The method may connect the LLM and ML into a single model, where all the weights of the model are trained together. The method may freeze some layers of the LLM while training some other layers. The method may implement one or a plurality of LORA (Low-Rank Adaptation of Large Language Models) to fine-tune the LLM model behavior and outputs using a lightweight technique, that significantly reduces the number of trainable parameters.

The machine learning model (ML) such as multilayer perceptron (MLP) model is built within a robust security infrastructure, ensuring its operation remains confined to authorized usage. This encapsulated environment for the ML model reinforces security protocols, making the method a reliable solution for handling and processing sensitive data without compromising the privacy or data integrity of the recipient information.

According to a second aspect, there is provided a system for selecting data related to a recipient, the system is configured to obtain one or more data sets; enrich data of the one or more data sets; normalize the data of the plurality of the data sets; form embeddings of the normalized data; and use machine learning to find from the embeddings a target embedding for a target recipient.

More specifically, the present disclosure provides a system for optimizing a goal using AI models, wherein the system comprises one or more processors configured to perform the steps of the method according to any one of present embodiments; at least one input interface configured to receive one or more input data sets and one or more instructions; a first AI model configured to generate first output data based on at least one of the one or more input data sets and the one or more instructions; a machine learning model configured to calculate one or more performance metrics for the first output data; a communication module configured to provide the one or more performance metrics to a second AI model; and the second AI model configured to generate second output data based on the calculated one or more performance metrics.

The system may be designed with a high degree of integration and interoperability, making it an addition to existing enterprise ecosystems. The system may interface with Customer Relationship Management systems (CRMs), Enterprise Resource Planning systems (ERPs), Customer Data Platforms (CDP), and other data platforms through its simple integration protocols employing various tools and methodologies.

The system may perform flexible content handling based on free formatted natural language text, eliminating the need for extensive data mapping. The sole exception pertains to identity information related to recipients, products, and deals which requires mapping to ensure precise data correlation and integrity. This streamlined integration approach not only facilitates smooth interoperability but also expedites the deployment process, enabling organizations to leverage the system's capabilities within their operational framework.

The system may incorporate several optimizations aimed at enhancing performance. These optimizations comprise of caching intermediate data and results, storing intermediate data in the GPU, employing sampling strategies, quantizing LLM weights and activations, and utilizing cached and approximated predictions. The system may employ keyword searches, structured data searches, and semantic searches for data enrichment. In generative AI literature, the semantic searches complementing data are often called Retrieval-Augmented Generation (RAG). In the system, the results of RAG are appended to each text $\lambda$, $\beta$, $\gamma$ and processed further according to the method as described in the first aspect.

Furthermore, the system supports the ingestion of images as input, similarly to text, for the parameters $\lambda$, $\beta$, $\gamma$, and $\delta$. The system may project the images into the embedding data set using a multimodal encoding or encoding-decoding LLM capable of handling both text and images within the same embedding data set. Similarly, with the expansion of LLM modalities, the system is designed to accommodate various input types, such as video, audio, and 3D models. The system enhances enterprise sales, marketing, service, and more through automated, personalized dialog optimization.

The system addresses domain ontologies across a broad spectrum of human situations and behaviors without explicit modelling. This is achieved through a two-fold approach: firstly the LLMs that normalize data and sample messages are trained on a corpus of data reflecting diverse life situations and have been pre-trained to incorporate domain knowledge. Secondly, the ML is trained to map complex dependencies within the one or more data sets, enabling the system to train and refine previously trained behavioral patterns.

To achieve optimal efficiency, the system can be trained through direct graphics processing unit (GPU) programming, emphasizing efficiency, continuous training, and parallelism. The architecture of the system is specifically designed to leverage the advantages of one or more GPUs in one or more computing nodes connected together, efficiently managing numerous simultaneous transactions through dynamic batching strategies. This optimization ensures that the system operates seamlessly, providing robust performance in a variety of scenarios.

The scalability of the LLM is achieved by scaling the LLM horizontally either as a third-party managed service, or as part of the system in cloud, on-premises or in hybrid or by scaling the system itself horizontally when utilizing an embedded LLM inference engine integrated to other components of the system. The system is designed to provide a flexible deployment architecture that caters to diverse organizational preferences, whether it's on-premises, on cloud platforms, or in a hybrid model. The system may be integrated with various LLMs, which can be either proprietary or open source. These LLMs may be hosted on-premises, in the cloud, or embedded within applications to offer a myriad of configuration possibilities to align with the specific deployment scenario or strategy. The deployment strategy of the system is crafted to meet the stringent requirements of entities in handling sensitive data. The system ensures that the privacy of the recipient is upheld, and data processing occurs within a secure paradigm.

Preliminary results validate the system's ability to efficiently explore a data set of messaging options and train effective messaging policies from responses. Online A/B tests show constant over 100% increase in conversion rate from the system-optimized messaging versus the control. Further, gains are observed when the system flexibly optimizes products, deals, and customer targeting in conjunction with messaging.

The test results confirm that automatically optimizing communications and interactions in a closed-loop system meaningfully improve business metrics.

According to the embodiments of the present disclosure, executing one or more of the steps in a plurality of AI contexts, and wherein the executing comprises: performing one or more of the steps in parallel across multiple AI contexts; or performing one or more of the steps in parallel across multiple AI contexts, and selecting a subset of AI contexts based on the one or more performance metrics calculated for the plurality of AI contexts; or performing one or more of the in parallel across multiple AI contexts, selecting a subset of AI contexts based on the one or more performance metrics calculated for the plurality of AI contexts, and discarding AI contexts with the one or more performance metrics not meeting predefined criteria.

The system according to the present disclosure may thus comprise a parallel processing module configured to perform the steps of the method according to any of the embodiments in multiple AI contexts simultaneously. The parallel processing module mat be configured to select a plurality of AI contexts based on the one or more performance metrics calculated for the multiple AI contexts; and discard AI contexts with the one or more performance metrics not meeting predefined criteria.

Performing steps in parallel across multiple AI contexts enables faster processing by distributing the computation workload across multiple AI contexts simultaneously, improving scalability and efficiency.

Performing steps in parallel and selecting a subset of AI contexts based on performance metrics allows the system to focus resources on the most promising AI contexts, optimizing performance and ensuring that only the most effective contexts contribute to achieving the optimization goal.

Performing steps in parallel, selecting a subset of AI contexts based on performance metrics and discarding AI contexts not meeting criteria enhances the system's efficiency by eliminating underperforming contexts, reducing resource wastage, and ensuring the optimization process prioritizes high-quality outputs aligned with predefined criteria.

The method and system according to the embodiments of the present disclosure, may further comprise using the one or more performance metrics to select output data by: maximizing an expected outcome based on the one or more performance metrics; or implementing a reinforcement learning algorithm to balance exploration and exploitation strategies; or aligning the selection with predefined user preferences or constraints.

Maximizing an expected outcome based on the one or more performance metrics ensures outputs are optimized to achieve the highest predicted benefit or utility, aligning directly with key objectives like increased revenue, customer engagement, or other measurable metrics. It simplifies decision-making by focusing on measurable outcomes and is particularly effective in stable environments where the highest value can be reliably predicted.

Implementing a reinforcement learning algorithm to balance exploration and exploitation strategies allows the system to discover new, potentially high-performing outputs (exploration) while continuing to utilize proven effective strategies (exploitation). This is particularly beneficial in dynamic or uncertain environments where long-term improvement requires testing and adapting to evolving patterns or conditions.

Aligning the selection with predefined user preferences or constraints offers customization and adaptability by incorporating user-defined rules or constraints, ensuring the outputs meet specific operational, ethical, or business requirements. This is particularly valuable when optimizing within a framework that prioritizes user-defined goals over purely data-driven outcomes, such as adhering to compliance standards or brand guidelines.

The selection strategies may be for example search, policy optimizing and decoding strategies. The selection strategies comprise at least one of beam search, graph search, greedy search, contrastive decoding, hybrid search, A star, Q star, Q-learning, depth-first search, or breadth-first search.

The system is further configured to repeat the steps of the method according to any of the embodiments. The iterative execution of the method steps enables continuous refinement of outputs, improving the system's adaptability, accuracy, and robustness in dynamic environments. This enhances learning efficiency, optimizes resource utilization, and ensures the system dynamically converges toward predefined goals or thresholds.

According to the some embodiments of the present disclosure, the system may comprise a training module configured to receiving one or more outcome data sets representing an outcome in response to the second output data; and training the machine learning model using at least one of the outcome data sets and at least one of: the one or more input data sets, the first output data, the second output data, the one or more performance metrics. In such embodiments, the training module may optionally be further configured to receive one or more outcome data sets representing an outcome in response to the second output data; and train at least of the first AI model or the second AI model using at least one of the outcome data sets and at least one of: the one or more input data sets, the first output data, the second output data, the one or more performance metrics.

According to another aspect, the present disclosure provides a machine-learning model for optimizing a goal using AI models, for use in the method of any one of the embodiments, wherein the machine-learning model comprises conditionable parameters configured to calculate one or more performance metrics for first output data generated by a first AI model based on the one or more input data sets, and provide the one or more performance metrics to a second AI model for generating second output data. This enables the machine-learning model to dynamically calculate performance metrics from first output data, allowing it to evaluate and optimize the effectiveness of the AI model's outputs. By providing these metrics to a second AI model, it facilitates the generation of refined second output data aligned with the optimization goal, ensuring continuous improvement and adaptability.

According to another aspect, the present disclosure provides a computer-implemented method of training the machine-learning model for optimizing a goal using AI models, the method comprising: receiving one or more outcome data sets representing an outcome in response to the second output data; and conditioning the machine learning model using at least one of the outcome data sets and at least one of: the one or more input data sets, the first output data, the second output data, the one or more performance metrics. This enables the machine-learning model to improve continuously by conditioning it with outcome data and related inputs, allowing it to learn from real-world results and refine its predictions. It ensures that the model adapts dynamically to changes, enhancing accuracy, efficiency, and alignment with the optimization goal.

According to another aspect, the present disclosure provides a computer-implemented method of generating a training dataset for the machine-learning model, the method comprising: processing the input data sets to generate first output data using a first AI model; calculating one or more performance metrics for the first output data using the machine-learning model; associating the one or more input data sets with respective one or more performance metrics and output data; and formatting the associated data as a structured training dataset. This enables the creation of a structured training dataset by associating input data, performance metrics, and output data, ensuring the machine-learning model is trained on relevant and well-organized information. It facilitates efficient learning, improves model accuracy, and ensures the training process aligns with the optimization goals.

According to another aspect, the present disclosure provides a training dataset for use in the method of training the machine-learning model, the dataset comprising: one or more outcome data sets representing an outcome in response to the second output data; and at least one of: the one or more input data sets, the first output data, the second output data, the one or more performance metrics, and the metadata linking the outcome data with the at least one of input data sets, the first output data, the second output data, the one or more performance metrics. This enables a comprehensive training dataset that links outcome data with input data, output data, performance metrics, and metadata, providing a structured and contextual basis for training the machine-learning model. It ensures efficient and accurate learning by preserving relationships between data elements, enhancing the model's ability to align with the optimization goals.

According to another aspect, the present disclosure provides a use of the method of any one the embodiments for at least one of: using AI models to optimize a goal; using AI models to search for a solution to a problem; making AI models capable of solving more difficult problems; enabling inference-time scaling for AI models; implementing search in AI models; improving robustness of AI model processing; improving prediction accuracy in machine learning workflows; optimizing decision-making in reinforcement learning algorithms; implementing continuous learning processes using AI models. This enables the application of AI models to optimize goals, solve complex problems, and enhance AI performance through improved robustness, prediction accuracy, and decision-making. It facilitates inference-time scaling, efficient search, and continuous learning, ensuring AI models adapt dynamically to evolving challenges and deliver optimal outcomes across various workflows.

According to another aspect, the present disclosure provides a computer program for optimizing a goal using AI models, the computer program comprising instructions which, when the program is executed by a processor, causes the processor to perform the method according to any one of the embodiments. This enables the computer program to execute the optimization method, allowing AI models to dynamically process data, calculate performance metrics, and refine outputs to achieve specified goals. It ensures seamless implementation of the method on a processor, facilitating automation and real-time adaptability in various optimization tasks.

According to another aspect, the present disclosure provides a computer-accessible data storage media comprising instructions which, when executed by a processor, cause the processor to perform the steps of the method according to any one of the embodiments. This enables the computer-accessible data storage medium to store instructions for executing the optimization method, allowing a processor to dynamically perform data processing, metric calculation, and output refinement. It facilitates portability, scalability, and easy deployment of the method across various systems and devices.

According to another aspect, the present disclosure provides a computer program product for optimizing a goal using AI models, the computer program product comprising one or more computer-accessible data storage media storing a program code, the program code comprising instructions that, when executed by a processor, cause the processor to perform the method according to any one of the embodiments. This enables the computer program product to provide a complete solution for executing the optimization method, with program code stored on accessible media that directs a processor to perform data processing, metric evaluation, and output refinement. It ensures efficient deployment and execution of AI-driven optimization across various platforms and systems.

According to another aspect, the present disclosure provides a software as a service for optimizing a goal using AI models, the software as a service comprises a cloud-based platform accessible via a network, wherein the cloud-based platform is configured to receive one or more input data sets related to an optimization goal and one or more instructions from a client device; determine one or more performance metrics associated with the optimization goal, the one or more performance metrics being configured to quantify aspects of interest related to the optimization; use a first AI model to analyze at least one of the one or more input data sets in combination with the one or more instructions to generate first output data; apply a machine learning model to the first output data to calculate one or more performance metrics that assess aspects of interest related to the optimization; provide the calculated one or more performance metrics to a second AI model to generate second output data aligned with the optimization goal; and iteratively refine the optimization process by reintroducing the second output data as part of the input data sets and repeating the steps until predefined completion criteria are satisfied.

This enables the cloud-based Software as a Service (Saas) platform for goal optimization using AI models, providing clients with accessible, scalable tools to process data, evaluate performance metrics, and iteratively refine outputs. By leveraging AI and machine learning, the service dynamically adapts to changing inputs and objectives, delivering optimized solutions with minimal client-side resource requirements.

DETAILED DESCRIPTION OF THE DRAWINGS

FIG. 1 is an exemplary diagram 100 of a method that illustrates relations and interactions between a recipient and an entity (e.g., a business enterprise) in accordance with an implementation of the disclosure. The exemplary diagram 100 depicts a brand and product affinity mapping 102, a behavioral insight graph 104, a product journey tracker 106, a persona message resonance 108, a context message confluence 110, and a product voice mapping 112. The exemplary diagram 100 further includes a recipient related axes 120, a brand and product dynamics matrix 122, a context matrix axis 124, and a message axis 126. The recipient related axes 120, the brand and product dynamics matrix 122, the context matrix axis 124, and the message axis 126 are correlated based on interactions 102, 104, 106, 108, 110, and 112.

The method continuously and automatically analyses all key relations of recipient communication to train an Artificial Intelligence (AI) model. The method continuously and automatically trains the AI model across one or more recipients, e.g., a user or a customer, and their interactions, thereby accumulating unparalleled business insights that extend across brands, products, segments, and situations of an entity (e.g., a business enterprise). The method may train AI model based on relationships to optimize current dialogues and enhance the method's robustness with each interaction. The method is trained and improved continuously, thereby provide unprecedented responsiveness to the changing market conditions and trends.

In the brand and product affinity mapping 102, the method may analyse recipient personas and determines the relation between different recipient personas and one or more brands and products of the enterprise. For example, the one or more brands can be Apple®, Microsoft®, Samsung®, etc. For example, the one or more products can be iPhone, MacBook, ThinkPad, etc. The method may predict a recipient's probability to engage, purchase, or suggest a brand to the recipient using a relation between the recipient personas and the one or more brands and products, thereby enabling the one or more brands to continuously customize their approach for different segments and individual recipients.

In the behavioral insight graph 104, the method may determine the interest of the recipient that corresponds to each purchase, communication, or website visit of the recipient and generates a picture based on the interest of the recipient. The method may determine recipient's needs, preferences, and potential pain points by determining the relation between the recipient's personas and recipient's history.

In the product journey tracker 106, the method may map the one or more brands and the one or more products with contexts of the recipient's history, thereby enabling the one or more brands to strategically position their products, promoting upselling, cross-selling, and maintaining consistent brand narratives.

In the persona message resonance 108, the method may determine optimal messages that resonate with specific recipient personas. The method ensures an alignment between a message and an expectation and an emotional state of the recipient during an event for example a marketing pitch or a support response.

In the context message confluence 110, the method ensures the creation of impactful and resonant dialogues that engage and lead to conversions by aligning messages with a recipient's purchase history, prior communications, and web browsing patterns.

In the product voice mapping 112, the method ensures the consistency of voice with a brand, while also being dynamic to adapt to changing recipient perceptions and market scenarios.

Figure 2:
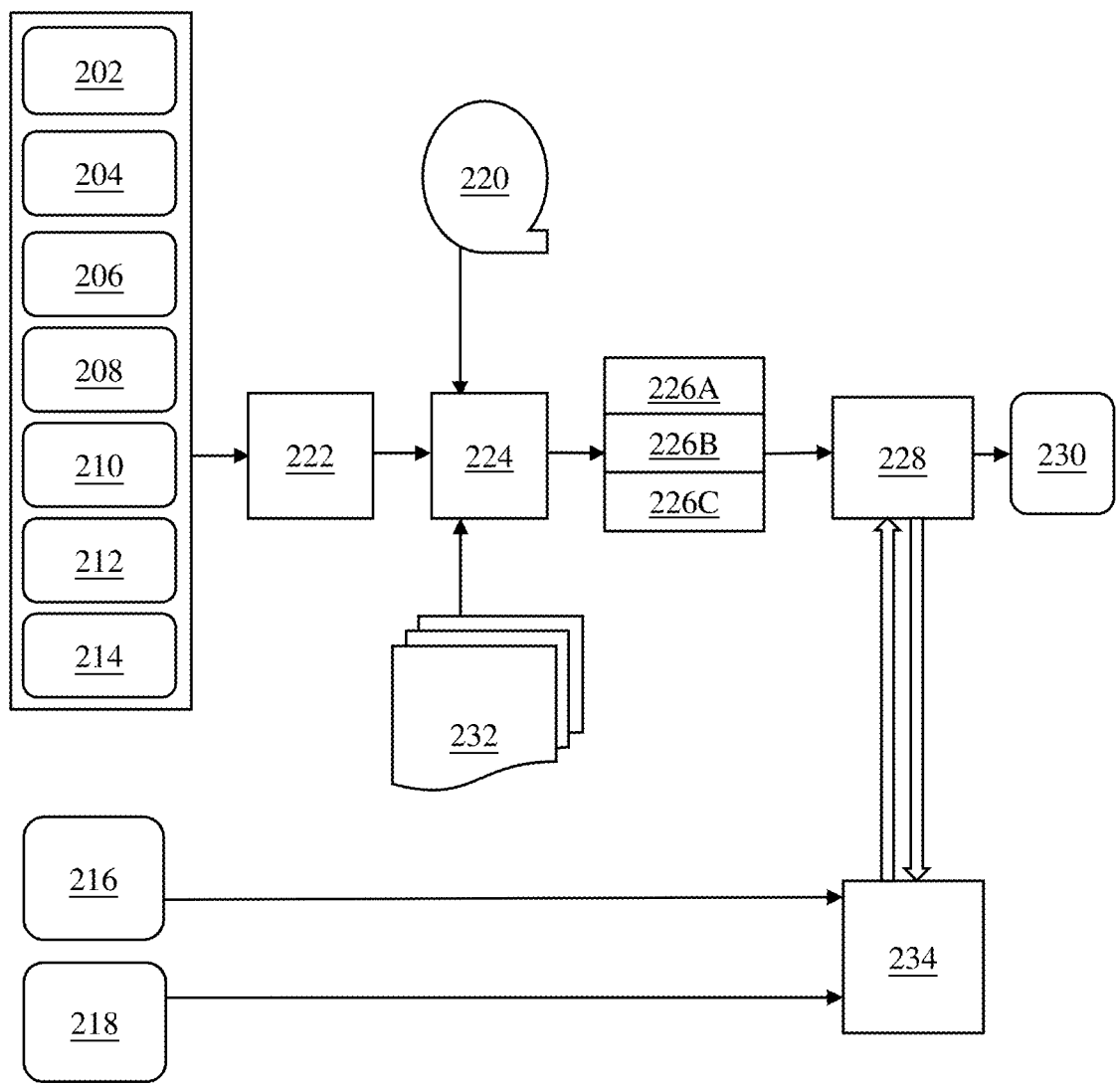
FIG. 2 is an exemplary view of a method for selecting data related to a recipient in accordance with an implementation of the disclosure.

FIG. 2 is an exemplary view of a method for selecting data related to a recipient in accordance with an implementation of the disclosure. The exemplary view depicts personal data 202, transaction data 204, recipient data 206, marketing data 208, support data 210, partner data 212, public data 214, prior outcomes 216, new outcomes 218, prompts 220, a data enrichment layer 222, a large language model (LLM) layer 224, first embedding 226A, second embedding 226B, third embedding 226C, a Machine learning (ML) model 228, expected outcomes 230, templates 232 and a parallel online training pipeline 234. The data enrichment layer 222 obtains data of one or more data sets. The one or more data set may include the personal data 202, the transaction data 204, the recipient data 206, the marketing data 208, the support data 210, the partner data 212, and the public data 214. The data enrichment layer 222 enriches the data of the one or more data sets. The LLM layer 224 normalizes the data of the one or more data sets. The LLM layer 224 may generate a plurality of messages. The LLM layer 224 may extract embeddings. The LLM layer 224 forms embeddings, e.g., a first embedding 226A, a second embedding 226B, and a third embedding 226C of the normalized data. The ML model 228 finds a target embedding for a target recipient from the embeddings, e.g., the first embedding 226A, the second embedding 226B, and the third embedding 226C. For example, outcomes can be revenue growth, profitability improvement, customer satisfaction, productivity, etc. The ML model 228 is trained based on the prior outcomes 216 in in the background. The ML model 228 is retrained by incorporating the new outcomes 218 received from the parallel online training pipeline 234. The ML model 228 is retrained to keep the ML model 228 updated in near real-time. The ML model 228 is continuously trained to predict the expected outcomes 230 of a specific message delivered to the target recipient.

Figure 3:
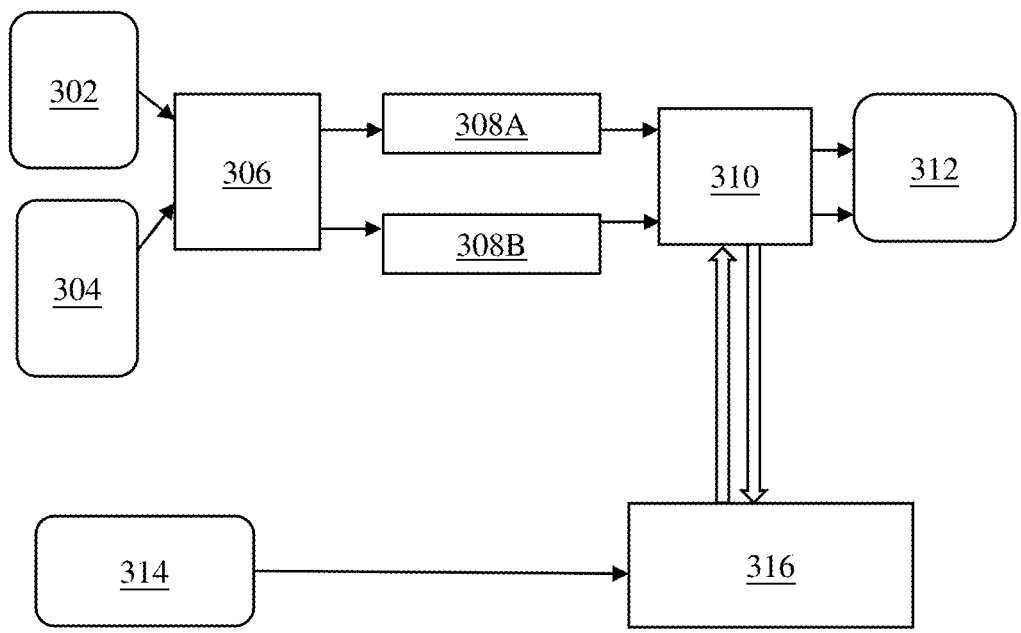
FIG. 3 illustrates an exemplary view of a method for implementing reinforcement learning to continuously optimize recipient sales dialog in accordance with an implementation of the disclosure.

FIG. 3 illustrates an exemplary view of a method for implementing reinforcement learning to continuously optimize recipient sales dialog in accordance with an implementation of the disclosure. The exemplary view depicts first data 302, second data 304, a large language model (LLM) layer 306, first embedding 308A, second embedding 308B, a Machine Learning (ML) model 310, expected outcomes 312, outcomes 314, and a parallel online training pipeline 316. The first embedding 308A is created for the first data 302 and the second embedding 308B is created for the second data 304. For example, the first data 302, and the second data 304 can be data related to one or more products and recipients. The ML model 310 is trained to identify an appropriate message for the expected outcomes 312 from embeddings, e.g., the first embedding 308A, and the second embedding 308B. The LLM layer 306 generates messages for both the first data 302 and the second data 304 separately. For example, the messages can be marketing messages. Optionally, separate embeddings are created for the first data 302, and the second data 304.

Figure 4:
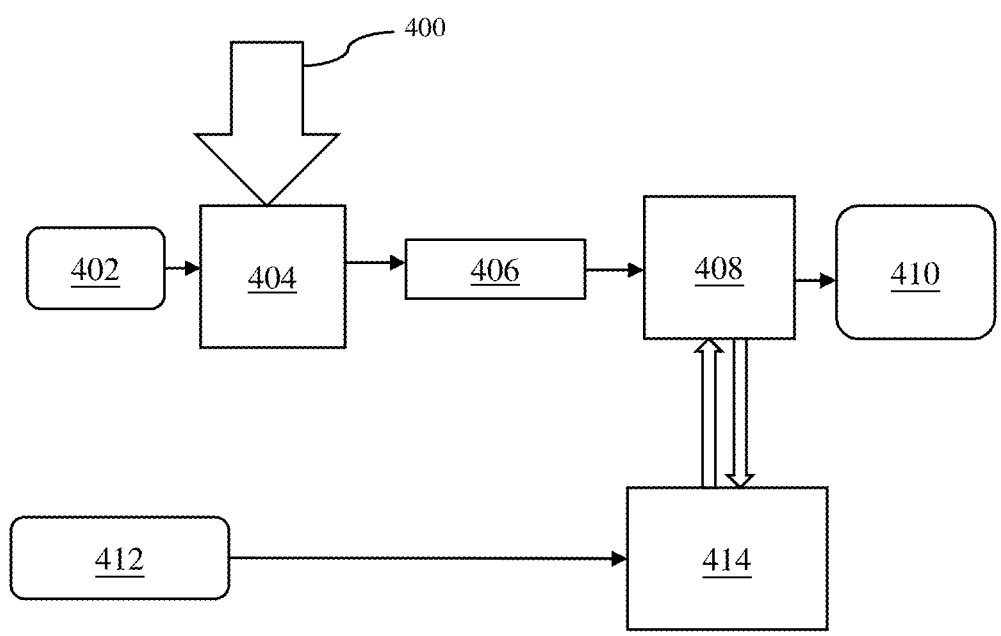
FIG. 4 illustrates an exemplary view of a method for handling unstructured data in accordance with an implementation of the disclosure.

FIG. 4 illustrates an exemplary view of a method 400 for handling unstructured data in accordance with an implementation of the disclosure. The exemplary view depicts data 402, a large language model (LLM) layer 404, embedding 406, a Machine Learning (ML) model 408, expected outcomes 410, outcomes 412, and a parallel online training pipeline 414. The LLM layer 404 is used as a feature extractor to extract unstructured data or structured data, e.g., text, and images. The LLM layer 404 may search, extract, and summarize parameters of each data. The LLM layer 404 applies LLM capabilities such as transformers to understand the interdependencies of the data 402, and to provide normalized data, which is normalized and standardized regardless of each data set. When handling unstructured data, there is no requirement for a developer or a recipient to define or implement mappings or conversions from one or more inputs. The LLM layer 404 can manage an input of any text, thereby enabling scalability to accommodate any recipients, situations, or data types. The LLM layer 404 normalizes the data 402 before it undergoes machine learning applications. This normalization process optimizes the data, addressing its diverse formats, content variations, and disparities. As a result, the LLM layer 404 enhances efficiency, reduces customization efforts, provides adaptability to a changing environment, and accelerates integration and validation timeline.

Figure 5:
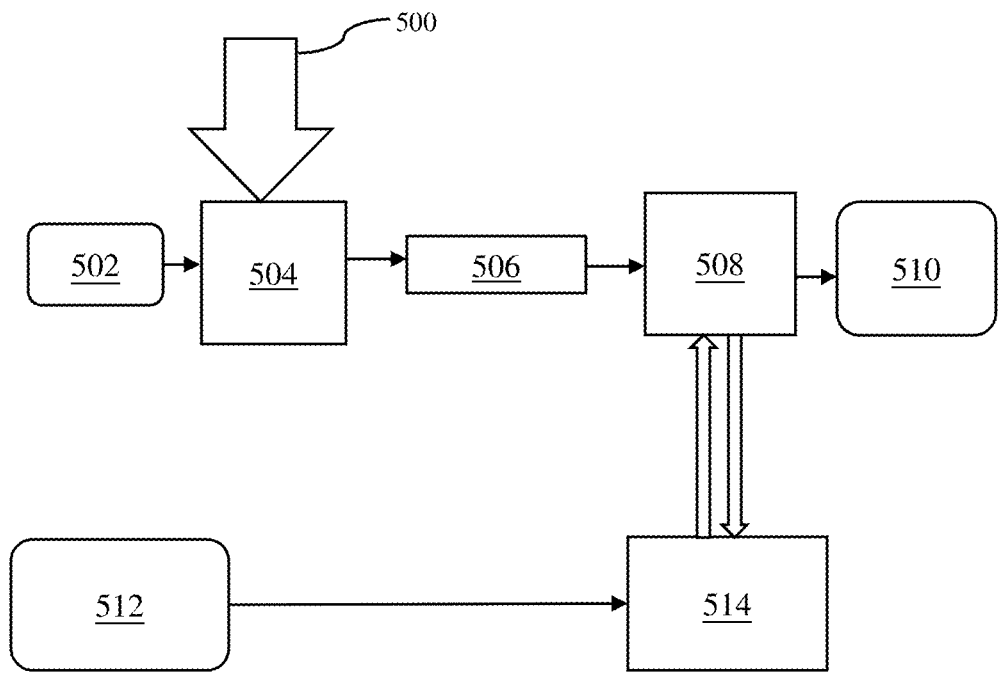
FIG. 5 illustrates an exemplary view of a method for handling missing data in accordance with an implementation of the disclosure.

FIG. 5 illustrates an exemplary view of a method 500 for handling missing data in accordance with an implementation of the disclosure. The exemplary view depicts data 502, a large language model (LLM) layer 504, embedding 506, a Machine Learning (ML) model 508, expected outcomes 510, outcomes 512, and a parallel online training pipeline 514. The LLM layer 504 generates values for missing data and derives the missing data from existing data when applicable. For example, if a person's residence is indicated as California, the LLM layer 504 assumes they live in the USA, even if the country is not mentioned. The LLM layer 504 may mark up the missing data as "missing". When handling the missing data, there is no requirement for developers or recipients to define strategies or policies. The LLM layer 504 handles the missing data and offers scalability across various recipients, situations, or data types without a need for manual intervention, thereby enabling fast deployment and time-to-market for the recipients. Without effective handling, missing data could disrupt machine learning models, preventing them from learning altogether or leading to inaccurate insights. The method can handle the missing data, thereby ensuring the model's robustness, facilitating accurate learning, and enhancing overall performance.

Figure 6:
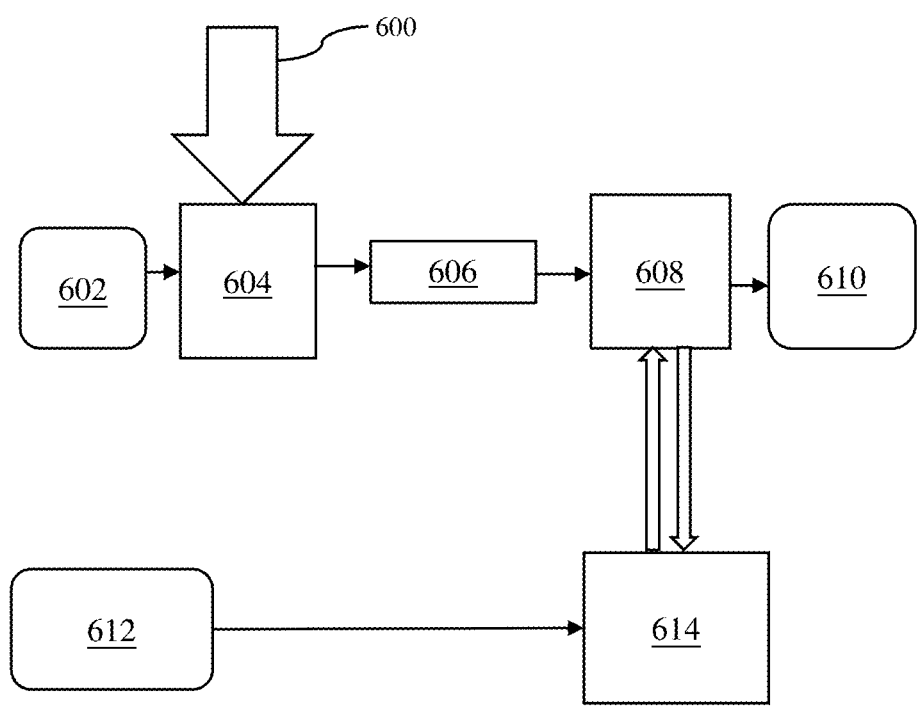
FIG. 6 illustrates an exemplary view of a method for normalizing data and feature extraction in accordance with an implementation of the disclosure.

FIG. 6 illustrates an exemplary view of a method 600 for normalizing data and feature extraction in accordance with an implementation of the disclosure. The exemplary view depicts data 602, a large language model (LLM) layer 604, embedding 606, a Machine Learning (ML) model 608, expected outcomes 610, outcomes 612, and a parallel online training pipeline 614. The LLM layer 604 is used as a feature extractor to extract unstructured or structured data, e.g., text, and images. The LLM layer 604 may search, extract, and summarize parameters of each data. The LLM layer 604 applies LLM capabilities such as transformers to understand interdependencies of the data 602, and to provide normalized data, which is normalized and standardized regardless of each data set. For example, a long browsing history is normalized as a statement that summarizes intent of the recipient, instead of a long list of web pages. When normalizing data and feature extraction, there is no requirement for a developer or recipient to define or implement mappings or conversions from various inputs. The LLM layer 604 can manage the input of any text, thereby enabling scalability to accommodate any recipients, situations, or data types. The LLM layer 604 provides a solution for normalizing the data 602 by ensuring compatibility among different data types. This compatibility is important for effective utilization in machine learning processes. The method has the capability to standardize diverse data types with varying structures and lengths optimizes integration process, enabling seamless utilization in machine learning models.

Figure 7:
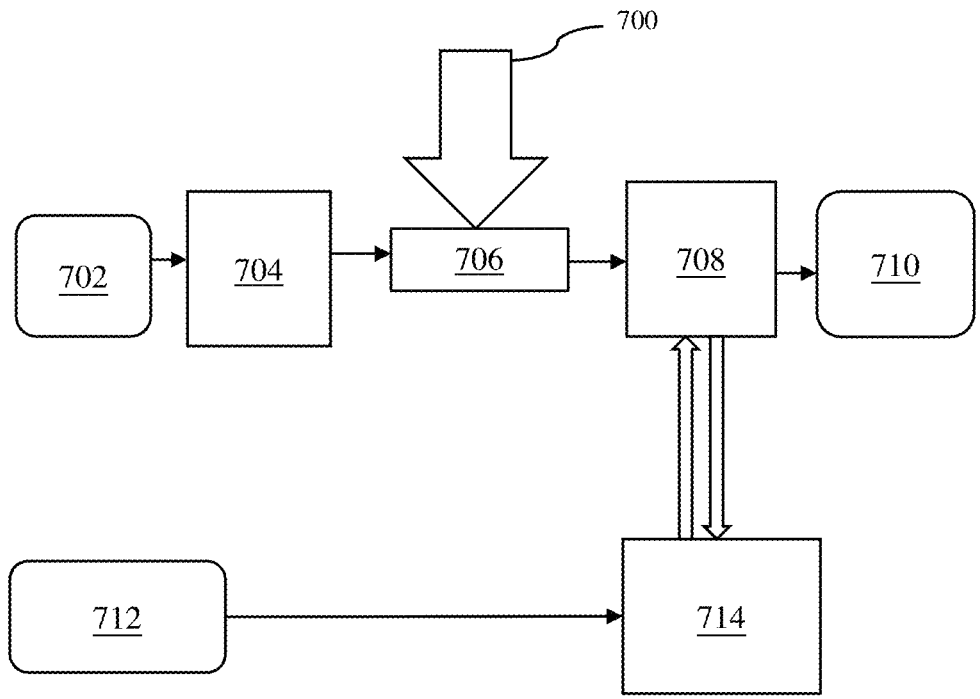
FIG. 7 illustrates an exemplary view of a method for representing data in accordance with an implementation of the disclosure.

FIG. 7 illustrates an exemplary view of a method 700 for representing data in accordance with an implementation of the disclosure. The exemplary view depicts data 702, a large language model (LLM) layer 704, embedding 706, a Machine Learning (ML) model 708, expected outcomes 710, outcomes 712, and a parallel online training pipeline 714. The method may employ an encoding LLM to individually project each data, e.g., recipient data, contextual data, and product data into an embedding. Each embedding is a vector of predetermined length; for example, embeddings can be of vectors of equal length for example 768 or 1536, where the LLM layer 704 semantically maps data 702 to an embedding 706. Additional scalar values in the data 702 may be appended to an end of the vector in a predetermined position in the vector; for example, the scalar values can be price or a lead time of a product. When representing data 702, there is no requirement for a developer or a recipient to define or implement mappings or conversions from various inputs. The LLM layer 704 can manage the input of any text, thereby enabling scalability to accommodate any recipients, situations, or data types. Even after normalization, some of the data may be a varying type. The method addresses this challenge by representing the data 702 that enables meaningful comparisons between different data types for relative similarity. The method represents each different data into a comparable standardized data set where different data can be compared for semantic similarity.

Figure 8:
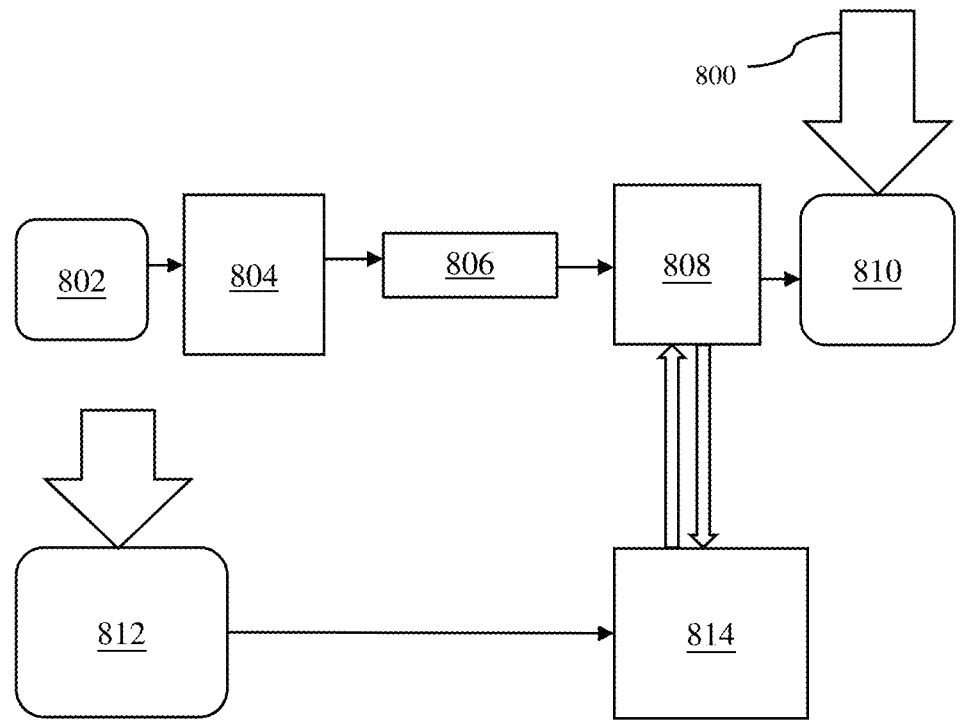
FIG. 8 illustrates an exemplary view of a method for representing outcomes in accordance with an implementation of the disclosure.

FIG. 8 illustrates an exemplary view of a method 800 for representing outcomes 812 in accordance with an implementation of the disclosure. The exemplary view depicts data 802, a large language model (LLM) layer 804, embedding 806, a Machine Learning (ML) model 808, expected outcomes 810, outcomes 812, and a parallel online training pipeline 814. The method assigns a value for each outcome event; for example, the outcome event can be purchase, subscription, or cancellation. This is done externally to the method, serving as a parameterization when the method is deployed. For example, in automation of cellular subscription upsells, the value assigned to each purchase reflects an increased price corresponding to a previous one. Similarly, cancellation of a subscription can be assigned a value equivalent to −2 times of the value of a preceding subscription. This valuation aims to incentivize the ML model 808 toward upselling while discouraging actions that might lead to the cancellation of existing subscriptions. Optionally, the outcomes 812 can also be discounted by time. For example, a purchase made today holds a higher value than a purchase in a month. The method can be used in any business optimization process without modifications; for example, the business optimization process can be to optimize conversion rates in a marketing and sales pipeline. Further, representing the outcomes enables scalability to any entity, recipient, situation, or data. The method represents different outcomes in a comparable manner. Hence, the ML model 808 can be trained to optimize the total outcome whether consisting of one or several metrics (KPIs).

Figure 9:
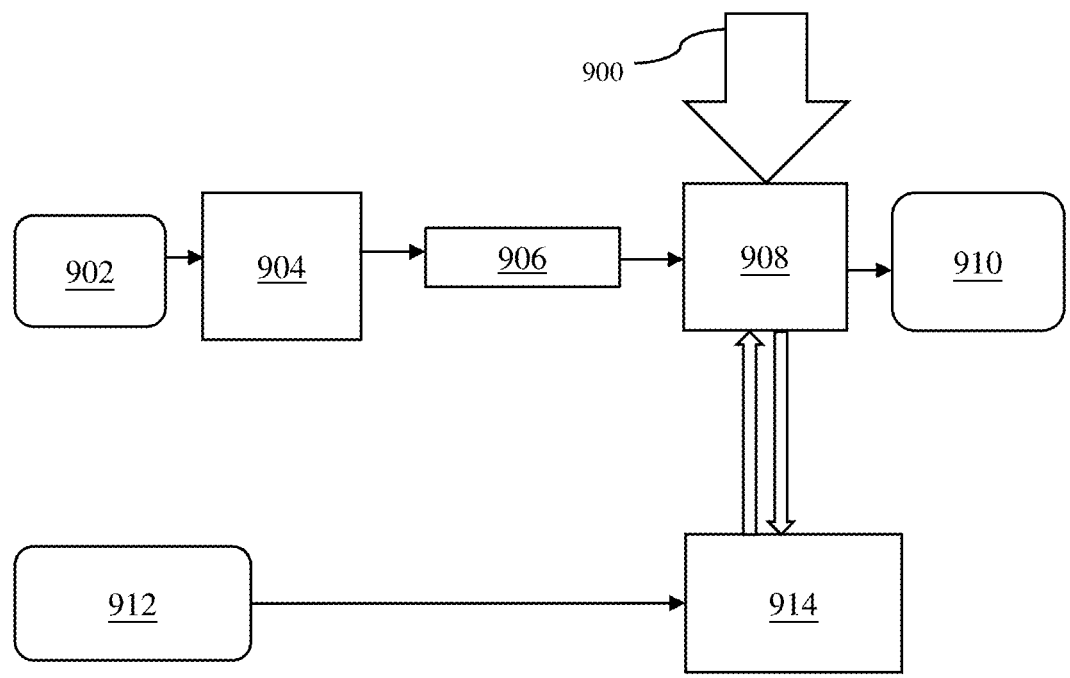
FIG. 9 illustrates an exemplary view of a method for learning recipient behavior in accordance with an implementation of the disclosure.

FIG. 9 illustrates an exemplary view of a method 900 for training recipient behavior in accordance with an implementation of the disclosure. The exemplary view depicts data 902, a large language model (LLM) layer 904, embedding 906, a Machine Learning (ML) model 908, expected outcomes 910, outcomes 912, and a parallel online training pipeline 914. The method concatenates fixed size embeddings into an input vector and a sum of all outcomes related to a specific recipient. The sum of outcomes can be discounted by time from time of each message to time of each outcome. The ML model 908 is trained to predict the expected outcomes 910 from the concatenated embeddings. Input includes a predefined type of data, e.g., recipient, context, and product in deterministic positions in the input vector. The ML model 908 is automatically trained based on business dynamics and recipient behavior to the extent that explaining data is available through recipient actions or inactions and without the need for the entity to perform any action. The ML model 908 is trained based on the recipient's behavior without a need for human intervention, feature engineering, or guidance. If there is no information in inputs, such as it is noise with respect to the outcomes 912, the ML model 908 is trained to ignore that data by assigning low weights for such inputs. The method enables scalability to any recipient, situation, or data. The method has powerful prediction accuracy and robustness. The ML model 908 is trained automatically with all the aspects of the recipient's behavior for predicting the outcomes (e.g., the expected outcomes 910).

Figure 10:
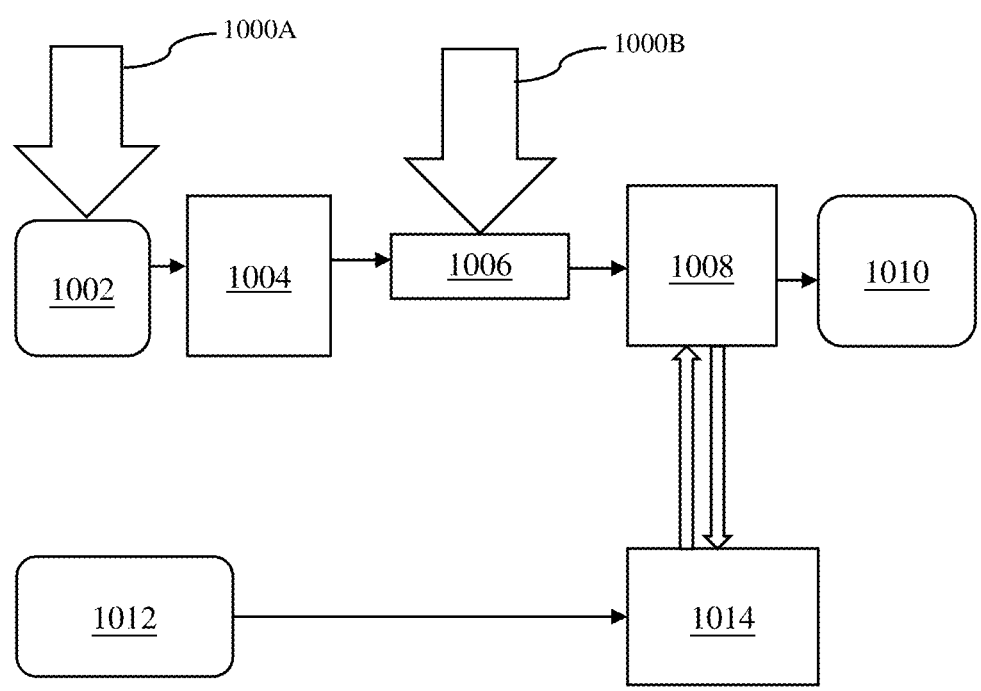
FIG. 10 illustrates an exemplary view of a method for caching of data in accordance with an implementation of the disclosure.

FIG. 10 illustrates an exemplary view of a method (1000A, and 1000B) for caching data in accordance with an implementation of the disclosure. The exemplary view depicts data 1002, a large language model (LLM) layer 1004, embedding 1006, a Machine Learning (ML) model 1008, expected outcomes 1010, outcomes 1012, and a parallel online training pipeline 1014. The method may store all embeddings for each data 1002. The method may store a hash of the data 1002. If a hash has not changed, the method uses embedding 1006 instead of LLM processing. The LLM processing can be 1000×-1 million times more resource intensive (CPU/GPU/memory) than the ML model 1008. The method performs in near real-time as only changed data goes through the LLM layer 1004, and other data, i.e., cached embeddings only through the ML model 1008 which has a latency in the order of milliseconds. This enables real-time web page rendering, e.g., competitive performance <30 millisecond (ms) latency, and interactive voice e.g., competitive performance <300 ms latency. The method may store intermediate steps of calculation and determine a need for the intermediate steps when a recalculation is needed to eliminate the LLM processing.

Figure 11:
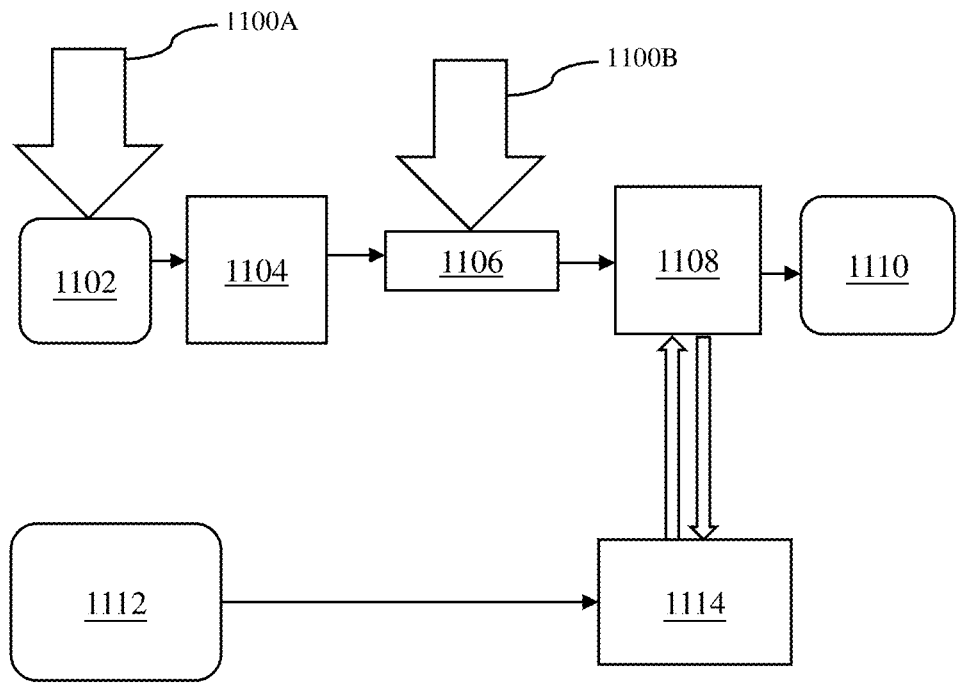
FIG. 11 illustrates an exemplary view of a method for approximation of embeddings in accordance with an implementation of the disclosure.

FIG. 11 illustrates an exemplary view of a method (1100A and 1100B) for approximation of embeddings in accordance with an implementation of the disclosure. The exemplary view depicts data 1102, a large language model (LLM) layer 1104, embedding 1106, a Machine Learning (ML) model 1108, expected outcomes 1110, outcomes 1112, and a parallel online training pipeline 1114. The method (i) uses LLM-calculated data, or (ii) searches for the nearest embedding using a KNN (K-Nearest Neighbors) or similar proximity search or clustering algorithm potentially using a lookup table within an available time limit. The lookup table may include a key, where the key is a combination of embedding of the previous version of the changed data and embedding of the latest change and a corresponding value is the resulting embedding. The method further calculates full LLM data in the background and updates the lookup table when needed once completed. The method performs user embedding based on a previous version of changed data and ignores a recent change within the available time limit. The method responds within a set maximum time-frame with available information at that time and supports real-time applications. For example, the set maximum time-frame can be 30-1000 ms; the set maximum time-frame can be 100 ms, 200 ms, 300 ms, 400 ms, 500 ms, 600 ms, 700 ms, 800 ms, 900 ms or 1000 ms. The method approximates the embeddings for data 1102 that cannot be processed in the time needed for the use case.

Figure 12:
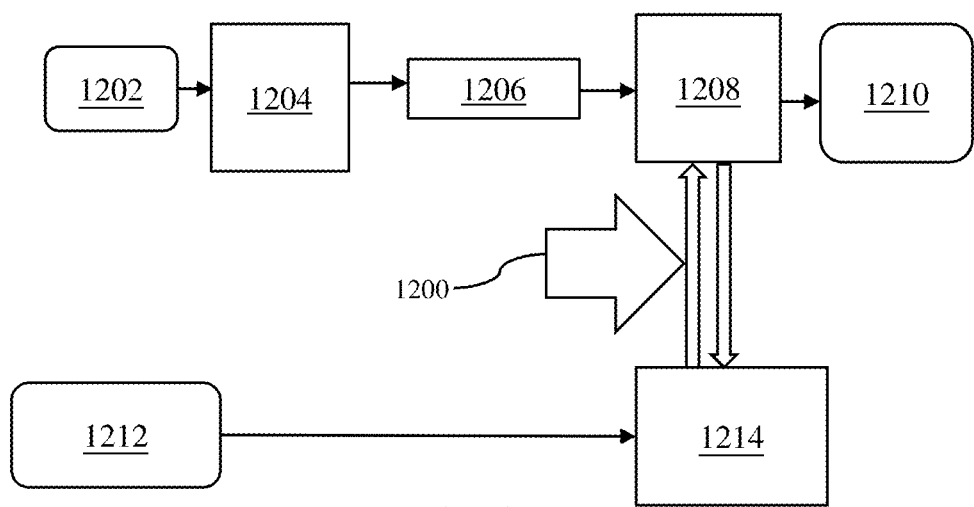
FIG. 12 illustrates an exemplary view of a method for continuous training of a Machine learning (ML) model in accordance with an implementation of the disclosure.

FIG. 12 illustrates an exemplary view of a method 1200 for continuous training of a Machine learning (ML) model 1208 in accordance with an implementation of the disclosure. The exemplary view depicts data 1202, a large language model (LLM) layer 1204, embedding 1206, the ML model 1208, expected outcomes 1210, outcomes 1212, and a parallel online training pipeline 1214. The method continuously, in parallel to serving a model, retrains the ML model 1208 with all previous data. The method decays older data over time to emphasize new information when available. When the ML model 1208 is updated, the method automatically deploys for serving. The method may promptly react to quick changes and trends in a market. The process of data decay facilitates the automatic replacement of older data, potentially obsolete data with more recent information. The ML model 1208 is continuously trained to accommodate all new information received. This changed information may include new inputs, new outcomes, and the absence of outcomes. Even if no new data has been received, an optimum model can be slightly different, as there is a different time passed from each data point. For example, no response to direct emails over extended time is new information that does not favor similar responses.

Figure 13:
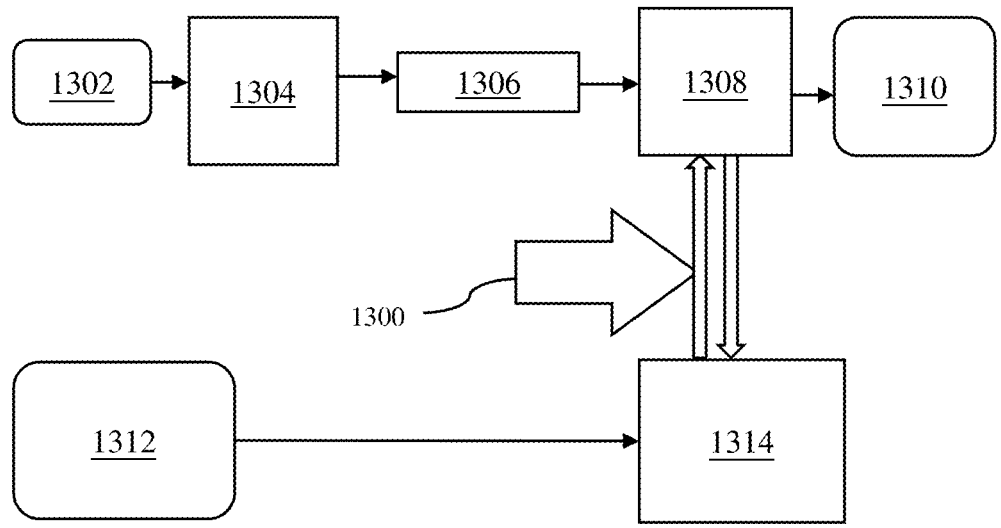
FIG. 13 illustrates an exemplary view of a method for continuous training optimization of the ML model in accordance with an implementation of the disclosure.

FIG. 13 illustrates an exemplary view of a method 1300 for continuous training optimization of a Machine Learning (ML) model 1308 in accordance with an implementation of the disclosure. The exemplary view depicts data 1302, a large language model (LLM) layer 1304, embedding 1306, the ML model 1308, expected outcomes 1310, outcomes 1312, and a parallel online training pipeline 1314. The method performs continuous training optimization to reduce a volume of the data 1302 to a fixed length. Optionally, fixed-length data can be trained in a predictable time. The method performs continuous training optimization to summarize embedding data, e.g., using clustering algorithms to represent multiple data points as one data point. For example, the clustering algorithms can be such as k-means. The one data point may be potentially weighted. The method performs continuous training optimization using any of the known clustering algorithms. For example, a training vector size is fixed as 1 million vectors and represents billions of vectors as their clustered 1 million means. Continuous retraining can be set to run at a constant time allowing consistent responsiveness of the method to changes in the environment, also over time even with increasing data. The method can be tuned between accuracy and responsiveness by adjusting a number of vectors representing training data. The method strategically drops out training data points that do not contribute to the learning.

Figure 14:
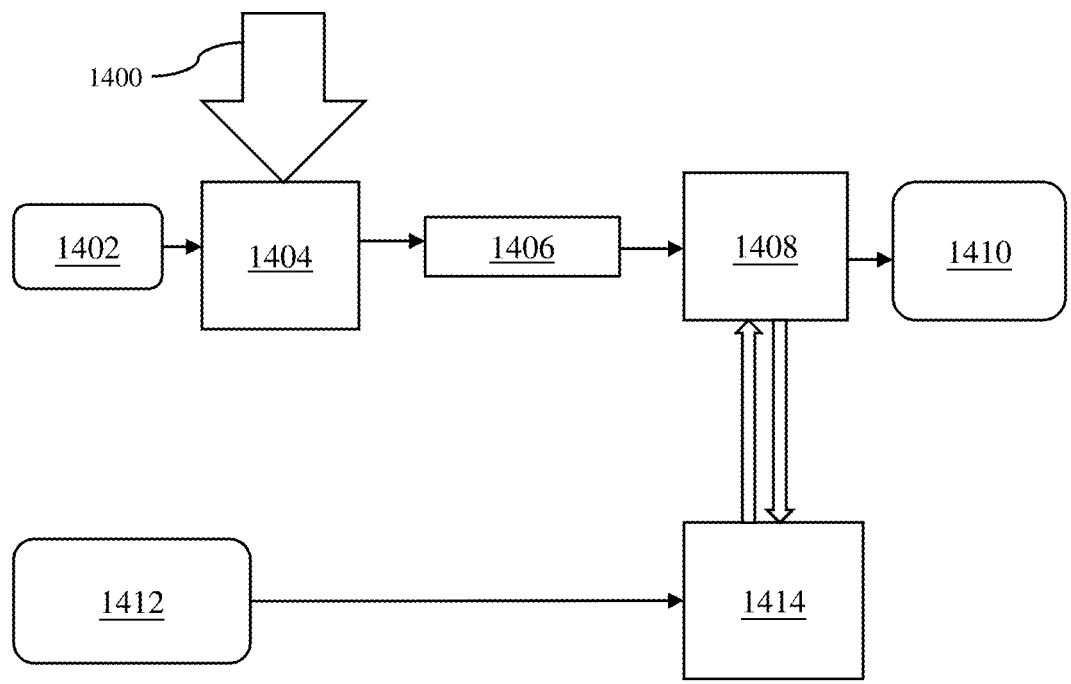
FIG. 14 illustrates an exemplary view of a method for sampling of messages in accordance with an implementation of the disclosure.

FIG. 14 illustrates an exemplary view of a method 1400 for sampling of messages in accordance with an implementation of the disclosure. The exemplary view depicts data 1402, a large language model (LLM) layer 1404, embedding 1406, a Machine Learning (ML) model 1408, expected outcomes 1410, outcomes 1412, and a parallel online training pipeline 1414. The method uses a decoder LLM to sample a message data set ($\Delta$) by prompting the message data set ($\Delta$) to (i) generate alternative messages conditionally to all normalized inputs and (ii) explore different perspectives. The LLM layer 1404 not only focuses on a prompt but also adeptly considers the messages that are generated by the LLM layer 1404, paying attention to all the messages, thereby ensuring efficient and effective production of a well-distributed array of meaningful alternative messages. The method generates high-quality alternative messages which allow for exploring and selecting a desired message in any situation. In addition, while generating the alternative messages, the method may extract the most recent message, use ML to predict its outcome, and insert value tokens into the output token sequence. These value tokens are configured to instruct the LLM of the expected value of the most recent message. The value tokens may be expressed in natural language, as numerical values encoded into tokens, or as specials tokens reserved for expressing the value. The value tokens are further configured to inform the LLM on the merits of each previously generated message. As the LLM attends previously generated messages with their value tokens while generating the next message, the value tokens implicitly help the LLM to guide its search towards the desired distribution, for example in the simplest case towards the highest predicted value, constituting of a form of a MCMC method.

The method efficiently samples high-quality messages that can be tested using the prediction for their expected outcome 1410, enabling the method to choose the message with the desired outcome. An example of a desired outcome is outcome value expectation maximization, or a stochastic selection criteria such as a higher outcome, the more probably that message is selected by the method.

Figure 15:
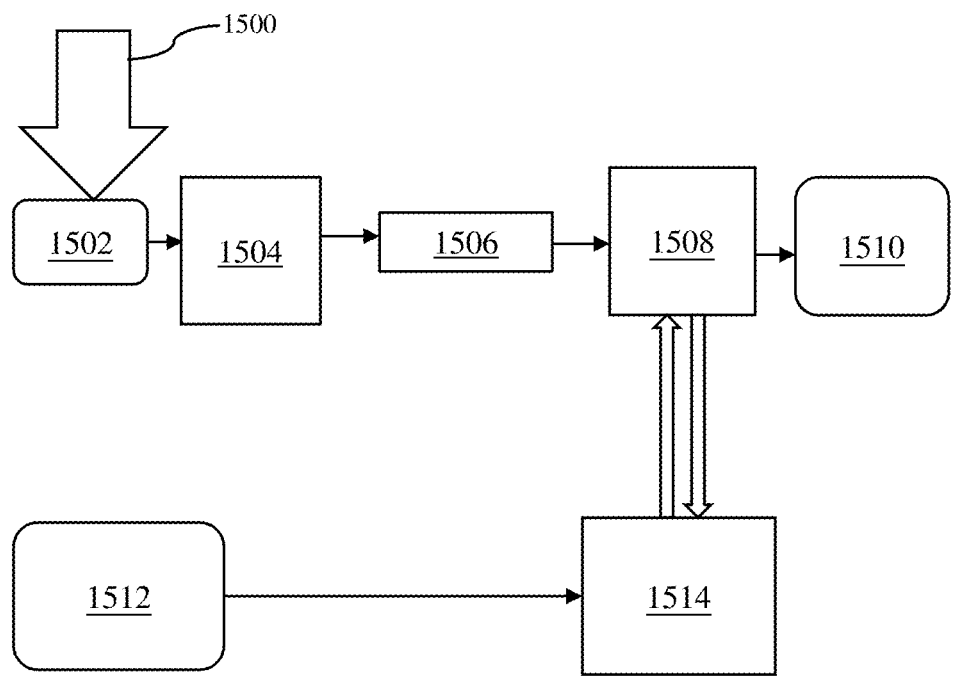
FIG. 15 illustrates an exemplary view of a method for iterating data inputs in accordance with an implementation of the disclosure.

FIG. 15 illustrates an exemplary view of method 1500 for iterating data in accordance with an implementation of the disclosure. The exemplary view depicts data 1502, a large language model (LLM) layer 1504, embedding 1506, a Machine Learning (ML) model 1508, expected outcomes 1510, outcomes 1512, and a parallel online training pipeline 1514. The method enables a recipient to select any brand, product, deal, promotion, recipient, or context, and to evaluate all or a desire subset of combinations for their cumulative expected outcomes 1510 using a user interface. The method enables the recipient to perform optimized targeting, product recommendations, pricing, bundling, and new product introduction based on the optimized expected outcomes 1510, thereby enabling optimization of a business. The method generates combinations of the desired data points for an evaluation system and selects the best message and predicts the expected outcomes 1510. For example, the method analyzes one or more recipients and one or more products, selects 1000 with the highest expected outcome 1510, and sends an email and a message to each recipient individually to promote a customized product. For example, the method may write a product description of variants A and B of a new product and evaluate both against all recipients to determine the highest expected outcome 1510.

Figure 16:
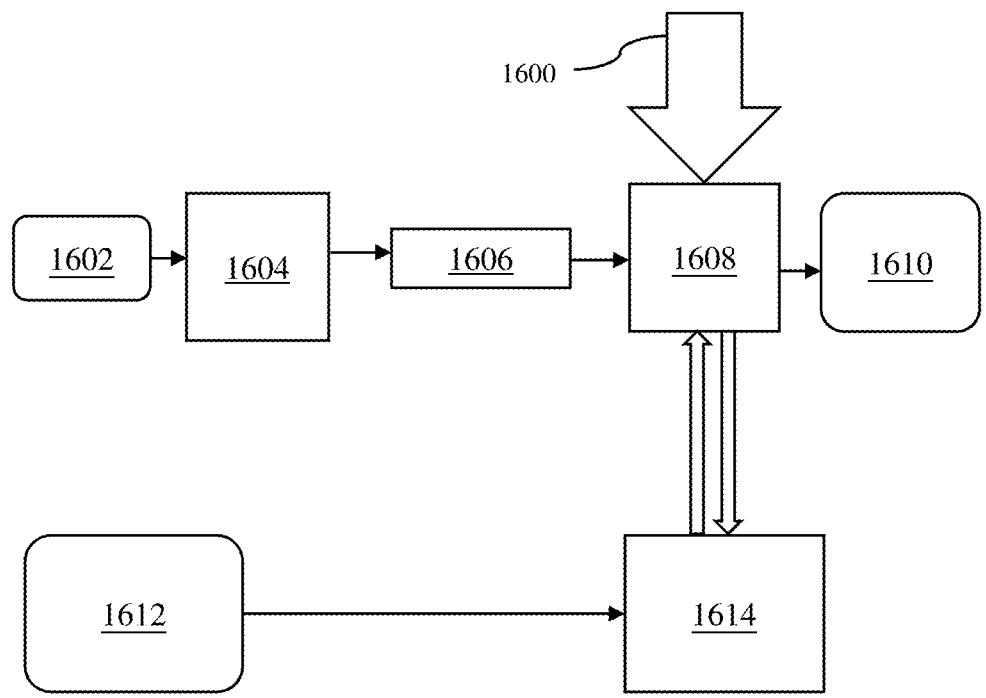
FIG. 16 illustrates an exemplary view of a method for privacy, compliance, and universal training in accordance with an implementation of the disclosure.

FIG. 16 illustrates an exemplary view of a method 1600 for privacy, compliance and universal training in accordance with an implementation of the disclosure. The exemplary view depicts data 1602, a large language model (LLM) layer 1604, embedding 1606, a Machine Learning (ML) model 1608, expected outcomes 1610, outcomes 1612, and a parallel online training pipeline 1614. The method does not train or fine-tune LLMs with entity data or recipient data. The method only trains the ML model 1608 which has already abstracted out sensitive data. The method uses out-of-the-shelf LLM models for feature extraction and message sampling. The LLM does not leak sensitive data, as they are not trained with the sensitive data and logically cannot contain such data. Training of the ML model 1608 can be based on multiple recipients and entities used together depending on commercial terms of usage. However, some recipients or entities may choose not to participate. This is possible because the training doesn't involve any sensitive data. For example, the ML model 1608 doesn't include information that a recipient A bought a red Tesla. Instead, the ML model 1608 may be trained based on information that a woman between 30 and 40 years old will choose red 37% of the time and other colors 63% of the time. When allowed, the method may train and accumulate ML level training across multiple recipients, e.g., hundreds of thousands of recipients, and multiple transactions, e.g., trillions of transactions, causing the method to train fundamental business dynamics of one or more entities.

Figure 17:
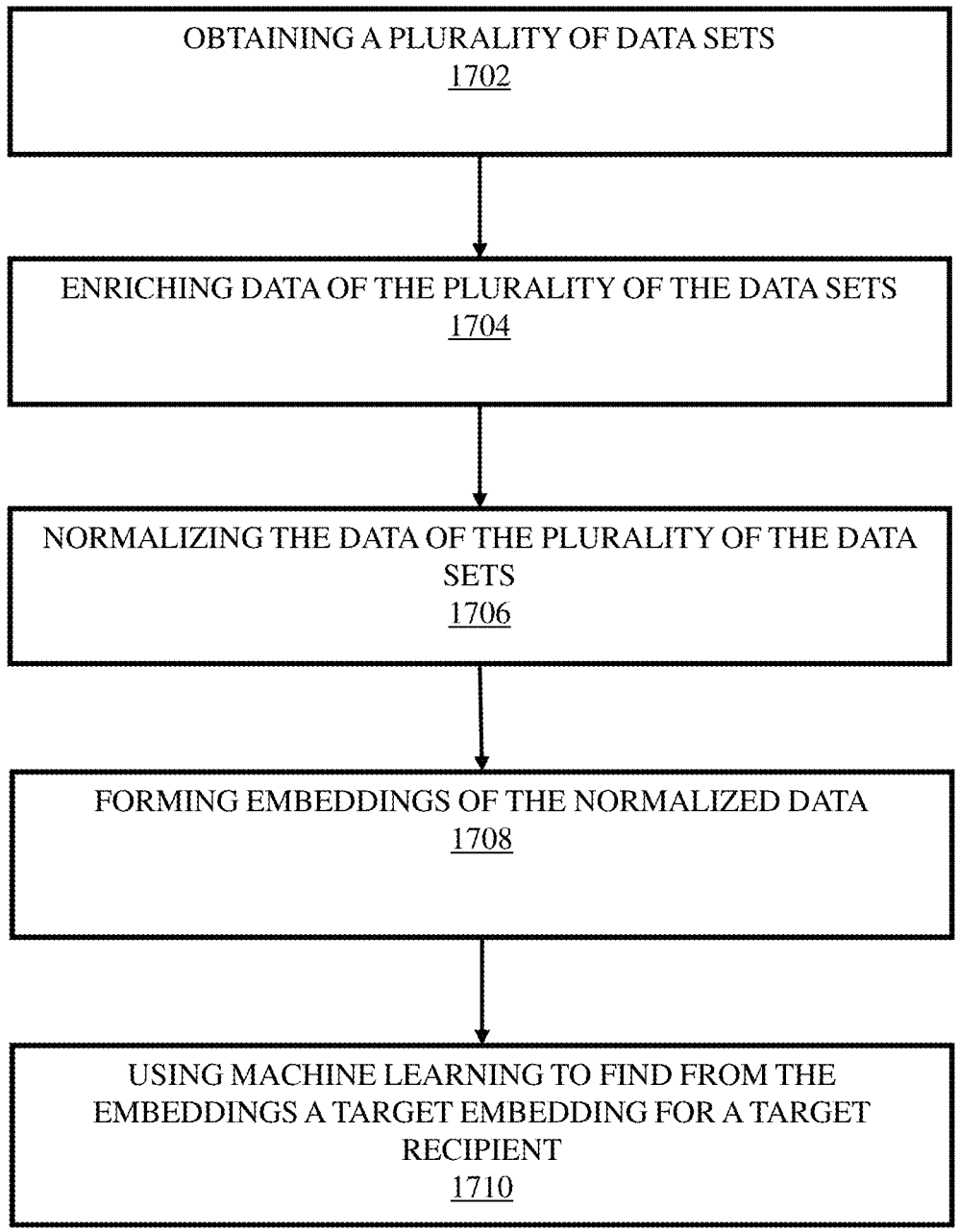
FIG. 17 is flow diagram that illustrate a method for selecting data related to a recipient in accordance with an implementation of the disclosure.

FIG. 17 is a flow diagram that illustrates a method for selecting data related to a recipient in accordance with an implementation of the disclosure. At a step 1702, one or more data sets are obtained. At a step 1704, data of the one or more data sets is enriched. At a step 1706, the data of the one or more data sets is normalized. At a step 1708, embeddings of the normalized data are formed. At a step 1710, machine learning is used to find from the embeddings a target embedding for a target recipient.

Figure 18:
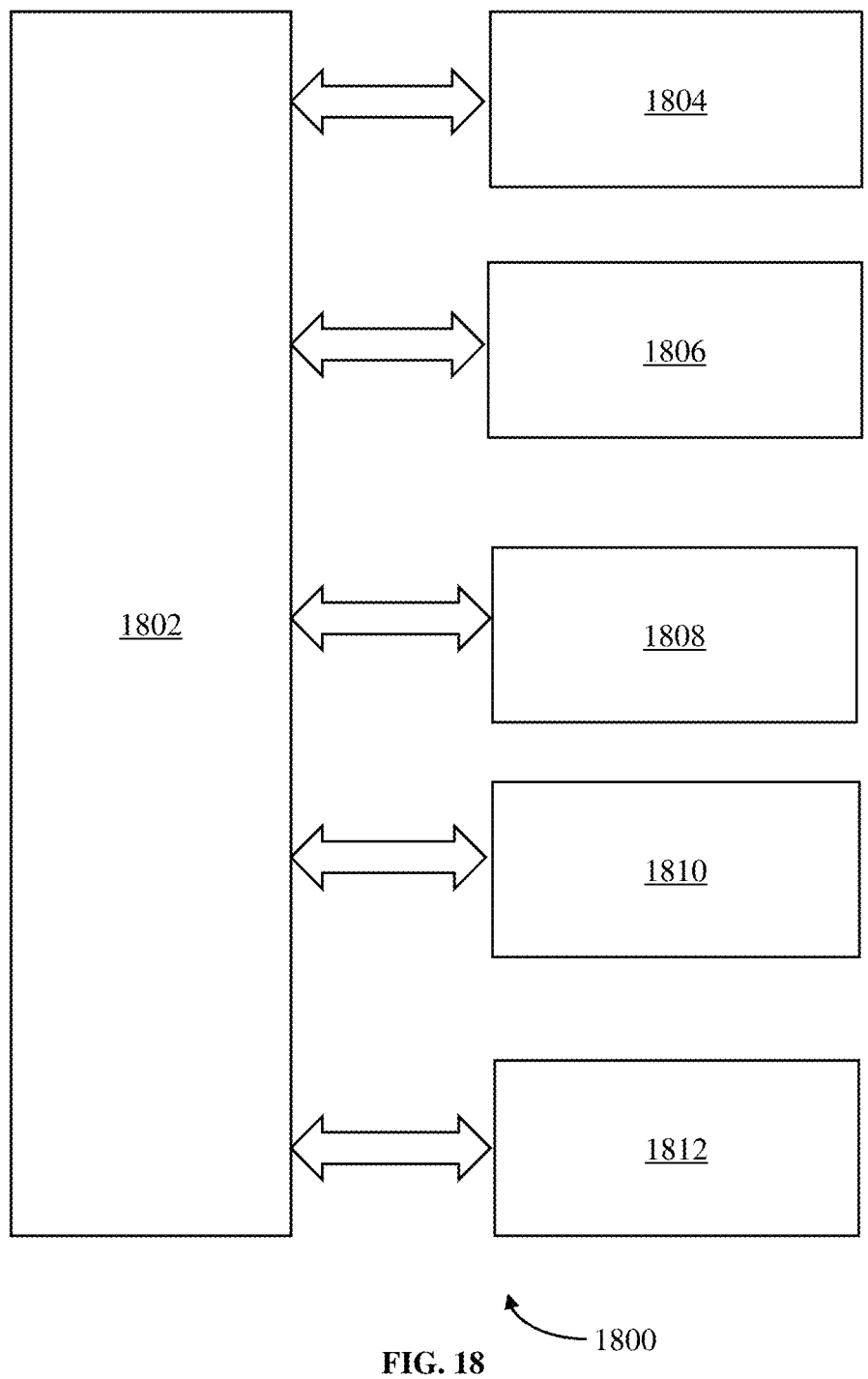
FIG. 18 is an illustration of a computer system (e.g., a system) in which the various architectures and functionalities of the various previous implementations may be implemented.

FIG. 18 is an illustration of a computer system (e.g., a system) in which the various architectures and functionalities of the various previous implementations may be implemented. As shown, the computer system 1800 includes at least one processor 1804 that is connected to a bus 1802, wherein the computer system 1800 may be implemented using any suitable protocol, such as Peripheral Component Interconnect, PCI-Express, Accelerated Graphics Port, AGP, Hyper Transport, or any other bus or point-to-point communication protocol. The computer system 1800 also includes a memory 1806.

Control logic (software) and data are stored in the memory 1806 which may take a form of random-access memory, RAM. In the disclosure, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation and make substantial improvements over utilizing a conventional central processing unit, CPU, and bus implementation. Of course, the various modules may also be situated separately or in various combinations of semiconductor platforms per the desires of a user.

The computer system 1800 may also include a secondary storage 1810. For example, the secondary storage 1810 may be a hard disk drive and a removable storage drive, representing a floppy disk drive, a magnetic tape drive, a compact disk drive, digital versatile disk, DVD drive, recording device, universal serial bus, and USB flash memory. The removable storage drives at least one of reads from and writes to a removable storage unit in a well-known manner.

Computer programs, or computer control logic algorithms, may be stored in at least one of the memory 1806 and the secondary storage 1810. Such computer programs, when executed, enable the computer system 1800 to perform various functions as described in the foregoing. The memory 1806, the secondary storage 1810, and any other storage are possible examples of computer-readable media.

In an implementation, the architectures and functionalities depicted in the various previous figures may be implemented in the context of the processor 1804, a graphics processor coupled to a communication interface 1812, an integrated circuit (not shown) that is capable of at least a portion of the capabilities of both the processor 1804 and a graphics processor, a chipset (namely, a group of integrated circuits designed to work and sold as a unit for performing related functions, and so forth).

Furthermore, the architectures and functionalities depicted in the various previous-described figures may be implemented in a context of a general computer system, a circuit board system, a game console system dedicated for entertainment purposes, an application-specific system. For example, the computer system 1800 may take the form of a desktop computer, a laptop computer, a server, a workstation, a game console, an embedded system.

Furthermore, the computer system 1800 may take the form of various other devices including, but not limited to a personal digital assistant, PDA device, a mobile phone device, a smart phone, a television, and so forth. Additionally, although not shown, the computer system 1800 may be coupled to a network (for example, a telecommunications network, a local area network, LAN, a wireless network, a wide area network, WAN such as the Internet, a peer-to-peer network, a cable network, or the like) for communication purposes through an I/O interface 1808.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

The invention claimed is:

1. A computer-implemented method for optimizing a goal using artificial intelligence (AI) models, the method comprising executing machine-readable instructions stored on a non-transitory medium by a processor for:

1.1 receiving one or more input data sets relevant to the optimization goal, the one or more input data sets including at least unstructured text or image data;

1.2 receiving one or more instructions defining operations to be performed on the one or more input data sets to achieve the optimization goal;

1.3 transforming the one or more input data sets into structured, semantically-encoded representations using a large language model (LLM) layer, the LLM layer configured to normalize and encode unstructured text or image data into structured, semantically-encoded data suitable for embedding;

1.4 processing the normalized one or more input data sets in combination with the one or more instructions using a first AI model to generate first output data;

1.5 applying a machine learning model to the first output data to calculate one or more performance metrics configured to quantify one or more aspects associated with the optimization goal;

1.6 providing at least one of the calculated one or more performance metrics or the first output data to a second AI model;

1.7 generating, by the second AI model second output data aligned with the optimization goal;

1.8 embedding the one or more input data sets and the second output data into dense vector representations using a trained embedding encoder, and 1.9 updating parameters of the machine learning model on outcomes derived from the dense vector representations; and 1.10 iteratively repeating steps 1.4 through 1.9 until a predefined criteria for completion for optimizing the goal is satisfied.

2. The method according to claim 1, wherein iteratively repeating the steps 1.4 through 1.9 further comprises introducing the second output data as part of the input data sets.

3. The method according to claim 1, wherein iteratively repeating the steps 1.4 through 1.9 further comprises using the second output data as new first output data, and applying the machine learning model to the new first output data to calculate updated one or more performance metrics.

4. The method according to claim 2, wherein the one or more performance metrics represent a predicted outcome in response to the first output data.

5. The method according to claim 1, wherein the first AI model and the second AI model comprise a same neural network instance.

6. The method according to claim 1, wherein the machine learning model;

and at least one of the first AI model or the second AI model are implemented as a shared model architecture.

7. The method according to claim 1, wherein the one or more performance metrics are calculated using the first output data in conjunction with at least one of the one or more input data sets.

8. The method according to claim 1, wherein executing one or more of the steps in a plurality of AI contexts, and wherein the executing comprises:

performing one or more of the steps in parallel across multiple AI contexts; or performing one or more of the steps in parallel across multiple AI contexts, and selecting a subset of AI contexts based on the one or more performance metrics calculated for the plurality of AI contexts; or performing one or more of the steps in parallel across multiple AI contexts, selecting a subset of AI contexts based on the one or more performance metrics calculated for the plurality of AI contexts, and discarding AI contexts with the one or more performance metrics not meeting predefined criteria.

9. The method according to claim 1, wherein the first output data comprises a sequence of tokens generated by the first AI model, the tokens being selected to match a predefined pattern.

10. The method according to claim 1, wherein the method further comprises providing the one or more performance metrics to the AI model by encoding the one or more performance metrics as tokenized text; or
providing the one or more performance metrics to the AI model as special tokens representing the values of the one or more performance metrics.

11. The method according to claim 1, wherein the method further comprises using the one or more performance metrics to select output data by: maximizing an expected outcome based on the one or more performance metrics; or
implementing a reinforcement learning algorithm to balance exploration and exploitation strategies; or
aligning the selection with predefined user preferences or constraints.

12. The method according to claim 11, wherein the selection strategies comprise at least one of beam search, graph search, greedy search, contrastive decoding, hybrid search, A star, Q star, Q-learning, depth-first search, or breadth-first search.

13. The method according to claim 1, wherein the method further comprises conditioning at least one of the first AI model or the second AI model based on at least one of: the one or more performance metrics, at least one of the one or more input data sets, or at least one of the first output data or the second output data.

14. The method according to claim 1, wherein the method further comprises preprocessing at least one of the one or more input data sets by performing at least one of: cleaning the input data; or enriching the input data.

15. The method according to claim 1, wherein the method further comprises encoding at least one of the one or more input data sets as embeddings.

16. The method according to claim 1, wherein the machine learning model comprises at least one of: a neural network, multilayer perceptron (MLP), support vector machines, decision-trees, random forests, gradient boosting machines, K-nearest Neighbors (kNN), naïve Bayes, linear regression, classifiers, logistic regression models, or principal component analysis (PCS).

17. The method according to claim 1, wherein the method further comprises:
receiving one or more outcome data sets representing an outcome in response to the second output data, and
conditioning at least of the machine learning model, the first AI model or the second AI model using at least one of the outcome data sets and at least one of: the one or more input data sets, the first output data, the second output data, the one or more performance metrics.

18. A system for optimizing a goal using AI models, wherein the system comprises:
one or more processors configured to:
1.1 receive one or more input data sets relevant to the optimization goal, the one or more input data sets including at least unstructured text or image data;
1.2 receive one or more instructions defining operations to be performed on the one or more input data sets to achieve the optimization goal;
1.3 transform the one or more input data sets into structured, semantically-encoded representations using a large language model (LLM) layer, the LLM layer configured to normalize and encode unstructured text or image data into structured, semantically-encoded data suitable for embedding;
1.4 process the normalized one or more input data sets in combination with the one or more instructions using a first AI model to generate first output data;
1.5 apply a machine learning model to the first output data to calculate one or more performance metrics configured to quantify one or more aspects associated with the optimization goal;
1.6 provide at least one of the calculated one or more performance metrics or the first output data to a second AI model;
1.7 generate, by the second AI model second output data aligned with the optimization goal;
1.8 embed the one or more input data sets and the second output data into dense vector representations using a trained embedding encoder, and
1.9 update parameters of the machine learning model on outcomes derived from the dense vector representations; and
1.10 iteratively repeat steps 1.4 through 1.9 until a predefined criteria for completion for optimizing the goal is satisfied;
at least one input interface configured to receive the one or more input data sets and the one or more instructions; and
a communication module configured to provide the one or more performance metrics to the second AI model.

19. The system according to claim 18, wherein the system further comprises a parallel processing module configured to perform steps 1.1 through 1.10 in multiple AI contexts simultaneously.

20. The system according to claim 19, wherein the parallel processing module is further configured to:
select a plurality of AI contexts based on the one or more performance metrics calculated for the multiple AI contexts; and
discard AI contexts with the one or more performance metrics not meeting predefined criteria.

21. The system according to claim 18, wherein the system is further configured to encode the one or more performance metrics as: tokenized text; or special tokens representing the one or more performance metrics value.

22. The system according to claim 18, wherein the system is configured to use the one or more performance metrics to select output data by:
maximizing an expected outcome based on the one or more performance metrics; or
implementing a reinforcement learning algorithm to balance exploration and exploitation strategies; or
aligning the selection with predefined user preferences or constraints.

23. The system according to claim 18, wherein the machine learning model and at least one of the first AI model or the second AI model are integrated into a single model.

24. The system according to claim 18, wherein the system further comprises an embedding encoder configured to encode at least one of the one or more input data sets as embeddings.

25. The system according to claim 18, wherein the machine learning model comprises at least one of: a neural network, a multilayer perceptron, support vector machines, decision trees, random forests, gradient boosting machines, K-nearest Neighbors (kNN), naïve Bayes, linear regression, classifiers, logistic regression models, or principal component analysis (PCS).

26. The system according to claim 18, wherein the system further comprises a training module configured to:
   receiving one or more outcome data sets representing an outcome in response to the second output data; and
   training the machine learning model using at least one of the outcome data sets and at least one of: the one or more input data sets, the first output data, the second output data, the one or more performance metrics.

27. The system according claim 26, wherein the training module is further configured to:
   receive one or more outcome data sets representing an outcome in response to the second output data; and
   train at least of the first AI model or the second AI model using at least one of the outcome data sets and at least one of: the one or more input data sets, the first output data, the second output data, the one or more performance metrics.

* * * * *